(12) United States Patent
Smith et al.

(10) Patent No.: US 12,705,075 B1
(45) Date of Patent: Aug. 11, 2026

(54) SYSTEMS AND METHODS FOR DYANMIC DATA CLASSIFICATION WITHIN A GRAPHICAL USER INTERFACE

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 19/169,132

(22) Filed: Apr. 3, 2025

(51) Int. Cl.
*G06F 9/451* (2018.01)

(52) U.S. Cl.
CPC .................................... *G06F 9/451* (2018.02)

(58) Field of Classification Search
CPC ........................................................ G06F 9/451
See application file for complete search history.

(56) References Cited

U.S. PATENT DOCUMENTS

| | | | | |
|---|---|---|---|---|
| 6,728,679 | B1 | 4/2004 | Strubbe et al. | |
| 11,347,940 | B2 | 5/2022 | Zhao et al. | |
| 11,405,337 | B2 | 8/2022 | Le et al. | |
| 11,940,964 | B2 * | 3/2024 | Barlew | G06F 16/9024 |
| 2018/0203571 | A1 * | 7/2018 | Dayanandan | G06F 8/38 |
| 2023/0297831 | A1 | 9/2023 | Saadi | |
| 2023/0409839 | A1 | 12/2023 | Yarabolu | |
| 2024/0379100 | A1 * | 11/2024 | Shivani | G10L 15/22 |
| 2025/0004428 | A1 * | 1/2025 | Anthony | G05B 13/0265 |
| 2025/0004910 | A1 * | 1/2025 | Baker | G06F 11/3612 |
| 2025/0085990 | A1 * | 3/2025 | Mahmud | G16H 50/20 |
| 2025/0138786 | A1 * | 5/2025 | Edge | G06F 8/30 |

FOREIGN PATENT DOCUMENTS

| | | | | |
|---|---|---|---|---|
| IN | 202014022267 A | 12/2020 | | |
| WO | WO-2024163759 A1 * | 8/2024 | | G06F 30/15 |

OTHER PUBLICATIONS

AI Tooltip, “AI for UI/UX—Full Creative Control!”, Nov. 23, 2024, youtube.com, https://www.youtube.com/watch?v=P-fPJPF8Wv4, pp. 1-29 (Year: 2024).*

Mayur Devle, “UI Designer’s Guide to Creating Forms & Inputs”, Jan. 11, 2023, Medium.com, https://medium.com/@mayurd0303/ui-designers-guide-to-creating-forms-inputs-5c91a2bae499, pp. 1-12 (Year: 2023).*

Better EHR Studio, “Layout Group Fields and Containers”, Jul. 25, 2024, docs.better.care, https://web.archive.org/web/20240725133622/https://docs.better.care/studio/form-builder/parts/layout-group-fields-and-containers/, pp. 1-12 (Year: 2024).*

* cited by examiner

*Primary Examiner* — Daniel W Parcher
(74) *Attorney, Agent, or Firm* — Caldwell LLC

(57) ABSTRACT

A system for dynamic data classification within a graphical user interface, the system including a computing device configured to receive a dynamic template including a plurality of input fields, identify at least one input field, generate, using a machine learning model, one or more input parameters for the at least one input field, wherein each input parameter of the one or more input parameters includes a metadata tag dictating a behavior of a user interface data structure, construct the user interface data, configure a remote device to generate a graphical view as a function of the user interface data structure, receive the communication datum from the remote device, wherein the communication datum includes a data response and a feedback element and dynamically modify the user interface data structure as a function of the communication datum.

20 Claims, 8 Drawing Sheets

SYSTEMS AND METHODS FOR DYANMIC DATA CLASSIFICATION WITHIN A GRAPHICAL USER INTERFACE

FIELD OF THE INVENTION

The present invention generally relates to the field of graphical user interfaces. In particular, the present invention is directed to systems and methods for dynamic data classification within a graphical user interface.

BACKGROUND

Feedback for machine learning models or large language models is generally given at the outset after all outputs are generated. Do to the relativeness of outputs, if a first output is inaccurate, then the subsequent output may be inaccurate as well. As a result, generating multiple outputs, without feedback, in a single iteration may result in inaccuracies. In addition, current systems lack the user interface infrastructure to provide feedback in real time and dynamically correct outputs prior to the subsequent generation of data.

SUMMARY OF THE DISCLOSURE

In an aspect, a system for dynamic data classification within a graphical user interface is described. The system includes at least a processor, and a memory communicatively connected to the at least a processor. The memory contains instructions configuring the at least a processor to receive a dynamic template including a plurality of input fields, identify at least one input field of the plurality of input fields for receipt of a communication datum and generate, using a machine learning model, one or more input parameters for the at least one input field wherein each input parameter of the one or more input parameters includes a metadata tag dictating a behavior of a user interface data structure. The processor is further configured to construct a user interface data structure as a function of the one or more metadata tags, wherein the user interface data structure includes a chatbot system, the one or more input parameters, an input identifier associated with the at least one input field of the plurality of fields and the dynamic template, configure a remote device to generate a graphical view as a function of the user interface data structure. receive the communication datum from the remote device, wherein the communication datum includes a data response and a feedback element and dynamically modify the user interface data structure as a function of the communication datum.

In another aspect a method for dynamic data classification within a graphical user interface is described. The method includes receiving, by at least a processor, a dynamic template including a plurality of input fields, identifying, by the at least a processor, at least one input field of the plurality of input fields for receipt of a communication datum, generating, by the at least a processor and using a machine learning model, one or more input parameters for the at least one input field, wherein each input parameter of the one or more input parameter includes a metadata tag dictating a behavior of a user interface data structure, constructing, by the at least a processor, a user interface data structure as a function of the one or more metadata tags, wherein the user interface data structure includes the one or more input parameters, an input identifier associated with the at least one input field of the plurality of fields and the dynamic template, configuring, by the at least a processor, a remote device to generate a graphical view as a function of the user interface data structure, receiving, by the at least a processor, the communication datum from the remote device, wherein the communication datum includes a data response and a feedback element and dynamically modifying, by the at least a processor, the user interface data structure as a function of the communication datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for dynamic data classification within a graphical user interface. In aspect, the present disclosure includes a computing device configured to receive a dynamic template having input fields, generate input parameters for the input fields, generate a user interface data a structure, receive a communication and dynamically modify the user interface data structure.

Aspects of the present disclosure can be used to provide an intuitive user interface that allows for providing feedback to machine learning models and large language models prior to generation of all outputs. Aspects of the present disclosure can further be used to populate dynamic templates with accurate information. Exemplary embodiments illustrating aspects of the present disclosure are described below in the context of several specific examples.

Figure 1:
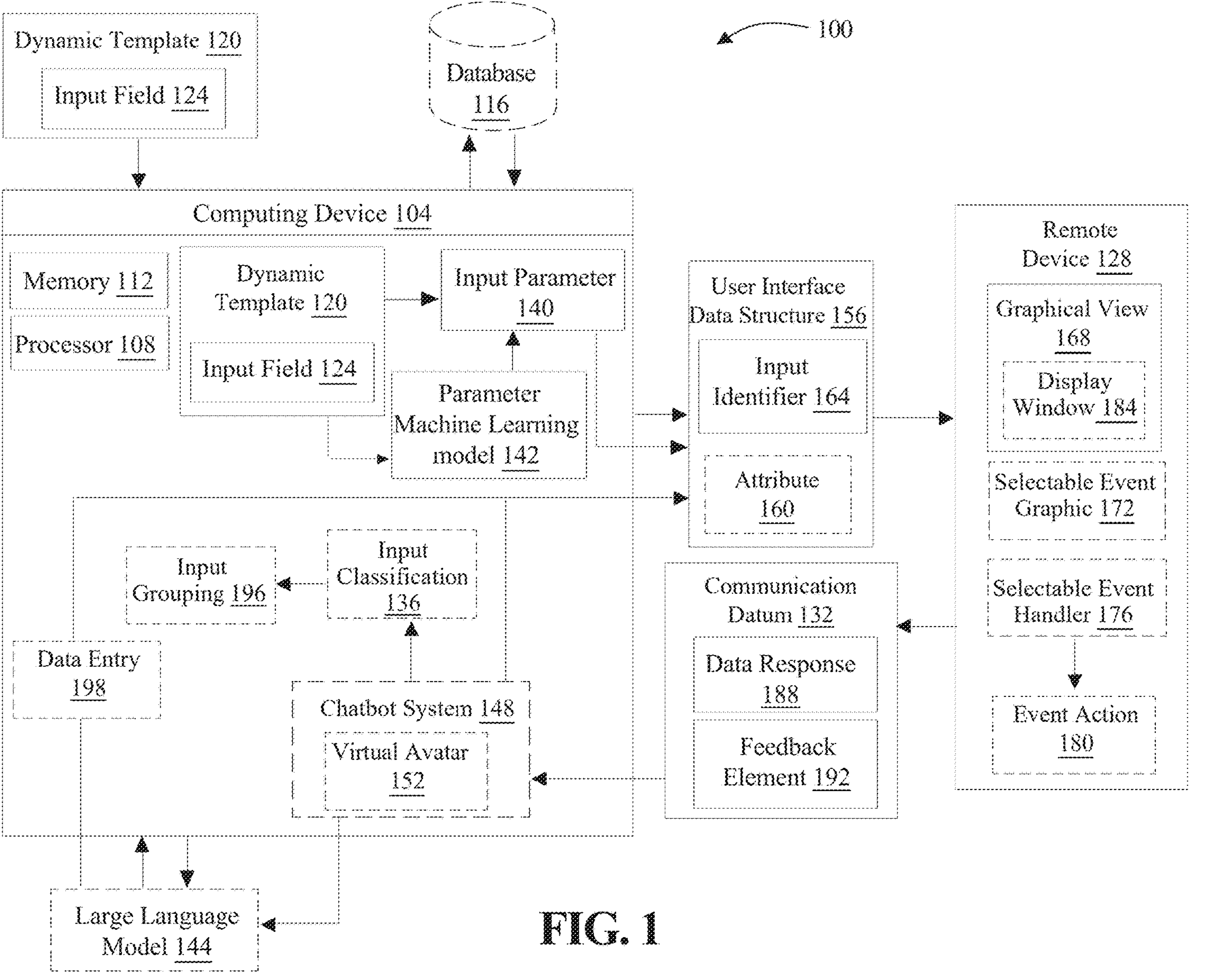
FIG. 1 is a block diagram illustrating an exemplary embodiment of a system dynamic data classification with a graphical user interface

Referring now to FIG. 1, a system 100 for validation of data entries for user interface data sets described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device 104. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU may be configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, system 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, one or more processes as described in this disclosure may be performed by server. In one or more embodiments, processor 108 may communicate with server to receive information needed for one or more instructions tasked by processor 108. In one or more embodiments, server may include one or more systems and/or software configured to provide information and/or data to processor 108. A "server" for the purposes of this disclosure is a system that provides resources, data or services to other computing systems over a network. For example, without limitation, server may include a web server, a file server, a database server, and/or the like.

With continued reference to FIG. 1, one or more processes as described in this disclosure may be performed by server. In one or more embodiments, processor 108 may communicate with server to receive information needed for one or more instructions tasked by processor 108. In one or more embodiments, server may include one or more systems and/or software configured to provide information and/or data to processor 108. A "server" for the purposes of this disclosure is a system that provides resources, data or services to other computing systems over a network. For example and without limitation, server may include a web server, a file server, a database 116 server, and/or the like.

With continued reference to FIG. 1, processor 104 is configured to receive a dynamic template 120. A "template" for the purposes of this disclosure is a pre-designed structure or framework that serves as a starting point for creating something new. For example, and without limitation, template may include a text document that has been preformatted to include desired fonts, the name of a company, various desired spacing and/or content breaks and/or the like. In one or more embodiments, template may include pre-written instructions and/or code for a computing device 104 to generate a word document, an email, a digital design and/or the like. In one or more embodiments, a template such as a word document may include empty fields which allow an individual to populate the empty fields. This may include for example, a "name section" wherein an individual may be put on notice that a name should be placed within the name section. In one or more embodiments, a template may include instructions in the form of text and/or imagery indicating what information is desired and/or in what portion of the template the information is desired. For example, and without limitation, template may include imagery indicating that a name should be placed at a particular portion of a digital document. A "dynamic template" for the purposes of this disclosure a template that can be iteratively modified and/or populated. For example, and without limitation, dynamic template 120 may include a digital document that can be populated with an individual's name, the date and/or any other information that may be desired to be placed within the digital document. In one or more embodiments, computing device 104 may populate dynamic template 120 with information based on information and/or instructions provided within the digital document. In one or more embodiments, dynamic template 120 may include a digital document such as a fillable PDF and/or an interactive PDF forms. In one or more embodiments, dynamic template 120 may include form fields such as text boxes, checkboxes, dropdown menus, buttons allowing for human interaction and/or the like.

With continued reference to FIG. 1, dynamic template 120 includes a plurality of input fields 124. An "input field" for the purposes of this disclosure is an element within a dynamic template 120 that allows for the receipt of information. For example, and without limitation, input field 124 may include a textbox that allows for the receipt of information generated by computing device 104 and/or an individual. In one or more embodiments, dynamic template 120 may include a plurality of inputs fields, wherein each input field 124 is configured for receipt of differing information. For example, without limitation, a first input field 124 may be configured to receive a name, a second input field 124 may be configured to receive a date and/or the like. In one or more embodiments, each input field 124 may include identifying information that may be used to identify that type of information that is to be populated within each input field 124. For example, and without limitation, a first input field 124 may include identifying information indicating that a name should be populated within their respective input field 124, while a second input field 124 may include information indicating that a date should be populated. In one or more embodiments, textual information may be situated within and/or near input field 124 in order to indicate the type of information that is sought. In one or more embodiments, input fields 124 may contain and/or be associated with textual and/or visual information that may indicate to an individual and/or a computing device 104 of the type of information that should be populated within the input field 124.

With continued reference to FIG. 1, dynamic template 120 may include one or more quadrants. A "quadrant" for the purposes of this disclosure refers to a grouping of similar input fields 124 within dynamic template 120. For example, and without limitation, a first quadrant may include groupings of inputs fields related to an individual's career, a grouping of input fields 124 associated with an individua's strengths and/or weaknesses and/or the like. In one or more embodiments, quadrants may signify that input fields 124 belong to the same grouping. In one or more embodiments, quadrants may include information indicating that grouping in which an input field 124 belongs to and/or is associated with. For example and without limitation, a first quadrant may include "best performance: better" wherein such information may indicate that the first quadrant is associated with input fields 124 associated with an individual's strengths. In another non limiting example, a second quadrant may include information such as "best results: bigger" wherein such information may indicate that the second quadrant is associated with measuring results and outcomes. In another non limiting example, a third quadrant may include information such as "being a hero: next 6 months" wherein such information may indicate that the input fields 124 are associated with major goals or projects to accomplish within the next 6 months. In another non limiting example, a fourth quadrant may include information such as "drives others crazy" wherein the fourth quadrant may contain input fields 124 associated with an individual's weakness. In one or more embodiments, dynamic template 120 may include one or more quadrants, wherein each quadrant may indicate the grouping in which a particular input field 124 is associated with. In one or more embodiments, quadrants may be modified and/or added by a user. In one or more embodiments, user may add input fields 124 associated with quadrants as well.

With continued reference to FIG. 1, input fields 124 may be configured to receive information such as, but not limited to, a name, a date, an individual's occupation, an individual's job title within the occupation, an individual's strengths, weaknesses and/or the like. In one or more embodiments, input fields 124 may include recently completed tasks, upcoming tasks, and/or the like. In one or more embodiments, each input field 124 may contain identifying information indicating what type of information such be populated within each specific input field 124. In one or more embodiments, dynamic template 120 may include a plurality of input fields 124, wherein each input field 124 contains identifying information indicating the type of information that is to be populated within the input field 124. In one or more embodiments, input fields 124 may be associated with a particular quadrant. In one or more embodiments, quadrant may signify the category of information, while input fields 124 may narrow the type of information sought. For example, and without limitation, quadrant may indicate an individual's strength, whereas a first input field 124 within the quadrant may seek the individua's strength with regards to alertness, curiosity, responsiveness, resourcefulness and/or the like. In one or more embodiments, each quadrant may identify the grouping in which input fields 124 belong to, while each induvial input field 124 may indicate the particular type of information sought within the grouping.

With continued reference to FIG. 1, dynamic template 120 may be received by a 3rd party, a user, from storage, through a web crawl and/or the like. A "User" as described herein refers to an individual interacting with computing device 104. In one or more embodiments, information that may be populated within input fields 124 may be associated with a user. In one or more embodiments, user may transit dynamic template 120 to computing device 104 through one or more input devices as described in this disclosure. In one or more embodiments, user may transmit dynamic template 120 from a remote device 128. A "remote device" for the purposes of this disclosure refers to a computing device 104 separate from that associated with system 100. For example, and without limitation, remote device 128 may include a smartphone, a laptop computer, a desktop computer and/or any other computing system containing a processor 104. In one or more embodiments, system 100 may operate on a server wherein remote device 128 may communicate with server. In one or more embodiments, remote device 128 may transmit dynamic template 120 to system 100 and/or to processor 104.

With continued reference to FIG. 1, processor 104 may perform OCR recognition to identify input fields 124, quadrants, and/or the like. In some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. A line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 4-6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 4-6.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 may identify at least one input field 124 of plurality of input fields 124 for receipt of a communication datum 132. In one or more embodiments, identifying at least one input field 124 may include selecting a first input field 124 from a plurality of input fields 124. In one or more embodiments, computing device 104 may identify input fields 124 within a digital document, wherein computing device 104 may first select the input field 124 located at the top of the document and select subsequent input fields 124 that are located below the preceding input field 124 on the digital document. In one or more embodiments, identifying at least one input field 124 may include identifying an input field 124 that has not yet been populated. In one or more embodiments, input fields 124 may be populated prior to receipt by computing device 104. In one or more embodiments, input fields 124 may be populated in previous iterations of the processing of system 100. In one or more embodiments, processor 104 may be configured to identify an input field 124 that has not yet been populated. In one or more embodiments, processor 104 may identify a sequential order for populating input fields 124, wherein processor 104 may identify input fields 124 based on the sequential order. In one or more embodiments, processor 104 may identify input fields 124 within the sequential order and identify input fields 124 that have not yet been populated. For example, and without limitation, processor 104 may determine that a first and second input field 124 have been populated and thereby select and/or identify a third input field 124 for receipt of a communication datum 132. In one or more embodiments, processor 104 may identify a plurality of input fields 124 and generate a sequential order for the plurality of input fields 124. In one or more embodiments, processor 104 may be use a large language model in order to generate a sequential order for receipt of information for input fields 124 based on what may be most commonly prioritized. For example and without limitation, an input field 124 requiring a name may be placed first in the order, while an input field 124 requiring a signature may be placed last. In one or more embodiments large language model may be configured to identify a sequential order for receipt of information within input fields 124 such that information may be received in the form of a virtual interaction between computing device 104 and user. In one or more embodiments, computing device 104 may simulate human interaction (as described in further detail below) in order to receive information necessary to populate input fields 124. In one or more embodiments, input fields 124 may be placed in sequential order based on what may be reasonably communicated in the course of a simulated human interaction. For example, and without limitation, it may be proper to first ask for a user's name, prior to receipt of any other information. As a result, an input field 124 associated with a name may be placed first within a sequence. In one or more embodiments, large language model may be configured to order to simulate human interaction rather than asking questions or seeking requests out of order.

With continued reference to FIG. 1, processor 104 may identify at least one input field 124 for receipt of communication datum 132. A "communication datum" for the purposes of this disclosure refers to information received from remote device 128. For example, and without limitation, a user may transmit a communication from remote device 128 in order to populate input field 124. In one or more embodiments, communication datum 132 may include any information received from remote device 128 in order to populate one or more input fields 124. In one or more embodiments, communication datum 132 may be received in the form of textual information, in the form of an audio and/or the like. In one or more embodiments, communication datum 132 may be generated by a user through input of information using one or more input devices on remote device 128 (e.g. a keyboard, a microphone, a camera) and/or the like. In one or more embodiments, communication datum 132 may include any information received by computing device 104 from remote device 128. in one or more embodiments, processor 104 may be configured to receive a plurality of communication datum 132, wherein each communication datum 132 may be used to populate a differing input field 124. Communication datum 132 will be described in further detail below. In one or more embodiments, processor 104 may identify more than one inputs fields. In one or more embodiments, processor 104 may identify input fields 124 that have not yet been populated.

With continued reference to FIG. 1, processor 104 may be configured to identify an input classification 136. An "input classification" for the purposes of this disclosure refers to a label that identifies a particular grouping in which the input field 124 belongs to. For example, and without limitation, input classification 136 may include a label indicating that the input field 124 is associated with the user's strength. In one or more embodiments, input classification 136 may be determined based on the quadrant in which an input field 124 is associated with. In one or more embodiments, input classification 136 may be identified using a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. For example, Processor 104 may generate and train an input classifier configured to receive input fields 124 and output input classifications 136. Processor 104 and/or another device may generate a classifier using a classification algorithm, defined as a process whereby a Processor 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. An input classifier may be trained with training data correlating input fields 124 to input classifications 136 such as name, occupation, strengths, weaknesses and/or the like. In one or more embodiments, processor 104 may generate and/or train input classifier in any way as described in this disclosure.

With continued reference to FIG. 1, processor 104 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 116 116, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry 198 cluster, generating a second vector output containing an input data, and calculating the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute 160, examples of which are provided in further detail below; a vector may be represented, without limitation, in n-dimensional space using an axis per category of value represented in n-tuple of values, such that a vector has a geometric direction characterizing the relative quantities of attributes 160 in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes 160, or any other measure of similarity suitable for any n-tuple of values, or aggregation of numerical similarity measures for the purposes of loss functions as described in further detail below. Any vectors for the purposes of this disclosure may be scaled, such that each vector represents each attribute 160 along an equivalent scale of values. Each vector may be "normalized," or divided by a "length" attribute 160, such as a length attribute 160 l as derived using a Pythagorean norm:

$$l = \sqrt{\sum_{i=0}^{n} a_i^2},$$

where $a_i$ is attribute 160 number i of the vector. Scaling and/or normalization may function to make vector comparison independent of absolute quantities of attributes 160, while preserving any dependency on similarity of attributes 160; this may, for instance, be advantageous where cases represented in training data are represented by different quantities of samples, which may result in proportionally equivalent vectors with divergent values.

With continued reference to FIG. 1, processor 104 may classify input fields 124 to input classifications 136. In one or more embodiments, processor 104 may use input classifier wherein input classifier may be configured to classify data input fields 124 to input classifications 136. In one or more embodiments, classifiers as described throughout this disclosure may be configured to output at least a datum that labels or otherwise identifies a set of data that are clustered together, found to be close under a distance metric as described below, or the like. In some cases, processor 104 may generate, and train input classifier configured to receive input field 124 and output input classifications 136. Input classifier may be trained with training data correlating inputs, such as input fields 124 and/or other inputs as described in further detail below to input classifications 136. Training data may include a plurality of inputs correlated to a plurality of input classifications 136. In an embodiment, training data may be used to show that a particular element or elements within an input (e.g. communication datum 132 and/or input field 124) may be correlated to a particular input classification 136. Training data may be received from an external computing device 104, input by a user, and/or previous iterations of processing. In some cases, inputs such as input field 124 may be classified using a classifier machine learning model. In some cases classifier machine learning model may be trained using training data correlating a plurality of input fields 124 and/or communication datum 132 correlated to a plurality of input classifications 136. In an embodiment, a particular element within an input field 124 and/or communication datum 132 may be correlated to an input classification 136. In some cases, classifying inputs may include classifying inputs as a function of the classifier machine learning model. In some cases classifier training data may be generated through input by a user. In some cases, classifier machine learning model may be trained through user feedback wherein a user may indicate whether a particular element corresponds to a particular categorization. In some cases, classifier machine learning model may be trained using inputs and outputs based on previous iterations. In some cases, a user may input feedback wherein classifier machine learning model may be trained based on the input.

With continued reference to FIG. 1, computing device 104 may utilize a machine learning model to classify inputs to input classifications 136. The machine learning model may include any machine learning model as described in this disclosure. Processor 104 may use a machine learning module, such as a classifier machine learning module for the purposes of this disclosure, to implement one or more algorithms or generate one or more machine-learning models, such as a classifier machine learning model to classify one or more inputs, such communication datum 132 and/or input fields 124. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or be provided by a user. In other embodiments, a machine-learning module may obtain a training set by querying a communicatively connected database 116 that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such as distortion machine learning module, may be used to create classifier machine learning model and/or any other machine learning model using training data. Classifier machine learning model may be trained by correlated inputs and outputs of training data. Training data may be data sets that have already been converted from raw data whether manually, by machine, or any other method. Classifier training data may be stored in database 116. Classifier training data may also be retrieved from database 116. In some cases, classifier machine learning model may be trained iteratively using previous inputs correlated to previous outputs. For example, processor 104 may be configured to store previous input fields 124 and/or communication datum 132 and correlated input classifications 136. In some cases, the machine learning model may be trained based on user input. For example, a user may indicate that determined categorizations are inaccurate wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like.

With continued reference to FIG. 1, input classifier may include parameter values. "Parameter values" for the purposes of this disclosure are internal variables that a machine learning model has generated from training data in order to make predictions. In one or more embodiments, parameter values may be adjusted during pretraining or training in order to minimize a loss function. In one or more embodiments, during training, predicted outputs of the machine learning model are compared to actual outputs wherein the discrepancy between predicted output and actual outputs are measured in order to minimize a loss function. A loss function also known an "err or function" may measure the difference between predicted outputs and actual outputs in order to improve the performance of the machine learning model. A loss function may quantify the error margin between a predicted output and an actual output wherein the error margin may be sought to be minimized during the training process. The loss function may allow for minimization of discrepancies between predicted outputs and actual outputs of the machine learning model. In one or more embodiments, the loss function may adjust parameter values of the machine learning model. In one or more embodiments, in a linear regression model, parameter values may include coefficients assigned to each feature and the bias term. In one or more embodiments, in a neural network, parameter values may include weights and biases associated with the connection between neurons or nodes within layers of the network. In one or more embodiments, during pretraining and/or training of the machine learning model, parameter values of the machine learning model (e.g. input classifier) may be adjusted as a based on feedback elements 192 provided within (communication datum 132 as described in further detail below). In one or more embodiments, feedback elements 192 may include feedback that a particular set of information has been classified to the wrong input classification 136. In one or more embodiments, a user may indicate that a particular input field 124 has been populated with accurate but non-associated information. In one or more embodiments, parameter values may be iteratively adjusted in order to refine the input classifier and ensure that data responses 188, feedback elements 192, and/or data entries (as described in further detail below) are properly classified.

With continued reference to FIG. 1, input classifications 136 may be determined based on the relative position of an input field 124 within a dynamic template 120. For example, and without limitation, an input field 124 located relative at the top of a dynamic template 120 may be associated with identifying information, such as a name, a date, etc. and be classified as such. In one or more embodiments, input fields 124 may be classified based on relativeness to other nearby input fields 124. For example, and without limitation, a first input field 124 requesting a strength of the individual and a second nearby input field 124 requesting a weakness of the individual may indicate to computing device 104 that the first input field 124 relates to an individual strengths, while the other input fields 124 relates to weaknesses. In one or more embodiments, a large language model (as described in further detail below) may be configured to identify the context of input fields 124 based on surrounding information, such as for example, textual information, other input fields 124 and/or the like.

With continued reference to FIG. 1, processor 104 is configured to generate one or more input parameters 140 for the at least one input field 124. An "input parameter" for the purposes of this disclosure refers to information or variables that are used to produce a specific outcome. For example, and without limitation, input parameters 140 may include limitations narrowing an input field 124 to a particular grouping and/or topic in order to ensure that information populated within the input field 124 is accurate. In one or more embodiments, input parameters 140 may include questions and/or prompts that may be transmitted to first device, such that a user may answer the questions, and such answers may be used to populate the input fields 124. In one or more embodiments, input parameters 140 may include questions that are targeted to user in order to limit the user's response to a particular topic, field, quadrant, input classification 136 and/or the like. For example, and without limitation, a question such as "what is your name" may be used to receive an answer from the user indicating their name. However, and continuing the example, a question such as "tell me about yourself" in order to receive the user's name may be inadequate, as the user given information that is not pertinent to the input field 124. In one or more embodiments, computing device 104 may generate input parameters 140 that are exclusive to the input field 124 that has been identified. This may be done in order to ensure that input fields 124 are properly populated. In one or more embodiments, processor 104 may use a machine learning model, such as parameter machine learning model 142 and/or a large language model in order to generate input parameters 140 for each input field 124. In one or more embodiments, the machine learning model includes a large language model. In one or more embodiments, processor 104 may receive a plurality of input fields 124 and generate input parameters 140 for each input field 124. In one or more embodiments, large language model may be configured to synthesize human conversation by generating questions that may be used to populated input parameters 140. In one or more embodiments, large language model may receive one or more identified input fields 124 and generate input parameters 140 for each input field 124. In one or more embodiments, large language model may first receive as an input a plurality of input fields 124 that need to be populated and output a plurality of input parameters 140. In one or more embodiments, large language model may then be configured to receive input parameters 140 as an input and synthesize a human conversation based on the input parameters 140. For example and without limitation, large language model may generate speech that may be used to interact with a user in order to convey input parameters 140 and populate input fields 124 based on the received communication datum 132. "Synthesizing human conversation" as described herein refers to the modification of information in order to replicate human speech. For example, and without limitation, an input parameter 140 may include information such "request name." however the input parameter 140 may be modified by the large language model such that it may state "let's start with your name." synthesizing human conversation may allow a user to interact with the large language model similar to how one would interact with another human. In one or more embodiments, large language model may receive input parameters 140 and generate "synthesized human speech" refers to information that has been transformed to replicate human speech. In one or more embodiments, large language model may first generate input parameters 140 and then generate synthesized human speech as a result. In one or more embodiments, synthesized human speech may include linking words or phrases such as "first", "next", "let's move on to the next question" and/or the like in order to replicate human conversation.

With continued reference to FIG. 1, processor is configured generate input parameters using a machine learning model, such as parameter machine learning model 142. In one or more embodiments, processor may use a machine learning module to implement one or more algorithms or generate one or more machine learning models, such as a parameter machine learning model 142. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In a further embodiment, training data may include previous outputs such that one or more machine learning models iteratively produces outputs.

With continued reference to FIG. 1, parameter machine learning model 142 may include a large language model as described in further detail below. In one or more embodiments, parameter machine learning model 142 may include any machine learning model as described in this disclosure. In one or more embodiments, parameter machine learning model 142 may be trained using parameter training data correlating input fields to input parameters. In one or more embodiments, parameter machine training data may include a plurality of input fields correlated to a plurality of input parameters. In an embodiment, a particular input field may contain one or more correlated input parameters. In one or more embodiments, parameter training data may be generated by a user, 3rd party and/or the like. In one or more embodiments, parameter training data may originally be generated using LLM, wherein LLM may generate a plurality of exemplary input fields and correlated input parameters. In one or more embodiments, parameter machine learning model 142 may include parameter values as described in this disclosure, wherein an initial set of parameter values may be generated by large language model. In one or more embodiments, parameter may use parameter values and/or parameter training data initially from LLM and use said parameter values and training data to iteratively train parameter machine learning model 142. In one or more embodiments, parameter values and parameter training data may originally be generated by LLM in order to increase the efficiency and/or increase the training time of parameter machine learning model 142. In one or more embodiments, parameter machine learning model 142 may then be iteratively trained used by receiving feedback elements 192 as described in further detail below. In one or more embodiments, parameter machine learning model 142 may be iteratively trained during generation of input parameters wherein upon generation of input parameters, a user may provide feedback elements 192 within communication datum 132 in order to provide feedback to parameter machine learning model 142. In one or more embodiments, prior to selection of a subsequent input field, parameter machine learning model 142 may update parameter values in order to train parameter machine learning model 142 for subsequent inputs. In one or more embodiments, parameter machine learning model 142 includes LLM.

Still referring to FIG. 1, system 100 may include and/or be communicatively connected to a large language model (LLM 144). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communications, advertising documents, newspaper articles, and the like. In some embodiments, training sets of an LLM 144 may include information from one or more public or private databases. As a non-limiting example, training sets may include databases associated with an entity. In some embodiments, training sets may include portions of documents associated with the electronic records correlated to examples of outputs. In an embodiment, an LLM 144 may include one or more architectures based on capability requirements of an LLM 144. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM 144 may be generally trained. As used in this disclosure, a "generally trained" LLM 144 is an LLM 144 that is trained on a general training set comprising a variety of subject matters, data sets, and fields. In some embodiments, an LLM 144 may be initially generally trained. Additionally, or alternatively, an LLM 144 may be specifically trained. As used in this disclosure, a "specifically trained" LLM 144 is an LLM 144 that is trained on a specific training set, wherein the specific training set includes data including specific correlations for the LLM 144 to learn. As a non-limiting example, an LLM 144 may be generally trained on a general training set, then specifically trained on a specific training set. In an embodiment, specific training of an LLM 144 may be performed using a supervised machine learning process. In some embodiments, generally training an LLM 144 may be performed using an unsupervised machine learning process. As a non-limiting example, specific training set may include information from a database 116. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM 144 may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM 144 may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM 144 may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM 144 may include a text prediction based algorithm configured to receive an article and apply a probability distribution to the words already typed in a sentence to work out the most likely word to come next in augmented articles. For example, if some words that have already been typed are "what is your", then it may be highly likely that the word "name" will come next. An LLM 144 may output such predictions by ranking words by likelihood or a prompt parameter. For the example given above, an LLM 144 may score "you" as the most likely, "your" as the next most likely, "his" or "her" next, and the like. An LLM 144 may include an encoder component and a decoder component.

Still referring to FIG. 1, an LLM 144 may include a transformer architecture. In some embodiments, encoder component of an LLM 144 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM 144 and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM 144 may predict the next word by searching for a set of positions in a source sentence where the most relevant information is concentrated. An LLM 144 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM 144, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM 144 may pick up particular parts at different positions in the input sequence and over time compute an initial composition of the output sequence. In multi-head attention, an LLM 144 may include a transformer model of an attention mechanism. Attention mechanisms, as described above, may provide context for any position in the input sequence. For example, if the input data is a natural language sentence, the transformer does not have to process one word at a time. In multi-head attention, computations by an LLM 144 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM 144 may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM 144 may either attend to all source words or predict the target sentence, thereby attending to a smaller subset of words.

With continued reference to FIG. 1, multi-headed attention in encoder may apply a specific attention mechanism called self-attention. Self-attention allows models such as an LLM 144 or components thereof to associate each word in the input, to other words. As a non-limiting example, an LLM 144 may learn to associate the word "you", with "how" and "are". It's also possible that an LLM 144 learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, “autoregressive” means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word “am,” decoder should not have access to the word “fine” in “I am fine,” because that word is a future word that was generated after. The word “am” should only have access to itself and the words before it. In some embodiments, this may be accomplished by implementing a look-ahead mask. Look ahead mask is a matrix of the same dimensions as the scaled attention score matrix that is filled with “0s” and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for “future tokens.”

Still referring to FIG. 1, second multi-headed attention layer may use encoder outputs as queries and keys and the outputs from the first multi-headed attention layer as values. This process matches the encoder’s input to the decoder’s input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers May allow an LLM 144 to learn to extract and focus on different combinations of attention from its attention heads.

With continued reference to FIG. 1, an LLM 144 may receive an input. Input may include a string of one or more characters. Inputs may additionally include unstructured data. For example, input may include one or more words, a sentence, a paragraph, a thought, a query, and the like. A “query” for the purposes of the disclosure is a string of characters that poses a question. In some embodiments, input may be received from a user device. User device may be any computing device 104 that is used by a user. As non-limiting examples, user device may include desktops, laptops, smartphones, tablets, and the like. In some embodiments, input may include any set of data associated with communication datum 132, input parameters 140, input fields 124 and/or the like.

With continued reference to FIG. 1, an LLM 144 may generate at least one annotation as an output. At least one annotation may be any annotation as described herein. In some embodiments, an LLM 144 may include multiple sets of transformer architecture as described above. Output may include a textual output. A “textual output,” for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, LLM 144 may be configured to receive one or more input fields 124 and output one or more input parameters 140. In one or more embodiments, a similar and/or second LLM 144 may be configured to receive input parameters 140 as an input and output synthesized human speech. In one or more embodiments, synthesized human speech may include requests to populate input fields 124 that have been replaced to mimic human interaction between the user and system 100. In one or more embodiments, LLM 144 may be configured to receive input fields 124, input classifications 136, quadrants and/or the like and generate input parameters 140. In one or more embodiments, input parameters 140 may include any information that may be used to populate input fields 124. For example and without limitation, an input field 124 asking for a user’s strengths may result in the generation of input parameters 140 such as “what is your occupation,” “what projects do you excel at,” “what hobbies do you engage in,” and/or the like in order to ascertain the individual’s strengths. In one or more embodiments, input parameters 140 may include synthesized human speech.

With continued reference to FIG. 1, system 100 includes a chatbot system 148. In one or more embodiments, processor 104 may configure a chatbot system 148 and/or virtual avatar 152 to communicate input parameters 140. A “virtual avatar,” as used in this disclosure is defined as an interactive character or entity in a virtual environment. In a non-limiting example, virtual avatar 152 may include a virtual representation of an individual in a virtual environment. In an embodiment, a virtual avatar 152 may be customizable. Virtual avatar 152 may include, without limitation, an animal, human, robot, inanimate object, and the like, and may include one or more personalized characteristics, wherein personalized characteristics may be programmed by an individual tasked with operating system. In a non-limiting example, virtual environment may include an extended reality space, such as, without limitation, augmented reality (AR) space, virtual reality (VR) space, and/or any other digital realities. For example, and without limitation, extended reality space may include a virtual classroom, virtual meeting room, virtual study room, and the like thereof. In one or more embodiments, virtual avatar 152 may include a virtual representation of a living being and/or inanimate object capable of conveying speech. In one or more embodiments, virtual avatar 152 may convey and/or request information to or from a user, such as communication datum 132. In one or more embodiments, virtual avatar 152 may be configured to convey information, such as input parameters 140 in the form of speech and/or synthesized human speech. In one or more embodiments, virtual avatars 152 may mimic a life coach or an intake specialist wherein virtual avatar 152 may represent an individual trying to document information pertaining to user. In one or more embodiments, virtual avatar 152 may include one or more text to speech algorithms in order to convey textual data in a vocal format. In one or more embodiments, virtual avatar 152 may be programmed to interact with a user (e.g., virtual avatar 152 may act as a medical professional speaking with a patient) of system and convey over information. In one or more embodiments, virtual avatar 152 may include a chatbot system 148 as described in reference to at least FIG. 3. In one or more embodiments, virtual avatar 152 and/or chatbot system 148 may be communicatively connected to a large language model, wherein the virtual avatar 152 is configured to receive questions or follow up questions from the user and utilize the large language model to generate response. For example, and without limitation, a user may respond with "can you define this word or explain it more simply" wherein virtual avatar 152 may transmit the interaction to the large language model (LLM 144), receive an output from the LLM 144 and convey the output to the user through the virtual avatar 152. In one or more embodiments, system 100 may include virtual avatar 152 wherein information transmitted and/or received by system may be done through virtual avatar 152 and/or chatbot system 148. A "chatbot system" for the purposes of this disclosure is a program configured to simulate human interaction with a user in order to receive or convey information. In some cases, chatbot system 148 may be configured to receive communication datum 132 and/or elements thereof and any other data as described in this disclosure through interactive questions, such as input parameters 140 presented to the user. In one or more embodiments, chatbot system 148 may be configured to simulate human interaction wherein chatbot system 148 may present questions in responses in a natural language format. In one or more embodiments, inputs by the user may also be received in a natural language format wherein chatbot system 148 may be configured to convert the inputs into computer languages. In one or more embodiments, chatbot system 148 may be configured to simulate human interaction in a variety of languages based on the preferences of a user. In one or more embodiments, while data processing and/or information received may be in a particular language, chatbot may be configured to translate data based on the preferences of the user. In one or more embodiment, chatbot may be configured to engage in passive data monitoring wherein a user's interactions with chatbot system 148 and/or computing device 104 may be recorded inexplicitly. For example, and without limitation, chatbot system 148 may present prompts to a user wherein chatbot system 148 may record the user's reaction time, the user's choice of words, the user's attention to detail in the answers and the like. In one or more embodiments, such interactions may be received as communication datum 132. In one or more embodiments, chatbot system 148 may be configured to record actions or behaviors that a user unconsciously exhibits. In one or more embodiments, chatbot system 148 may be configured to communicate input parameters 140 to a user.

With continued reference to FIG. 1, chatbot system 148 may communicate with a user in order to simulate human interaction. In one or more embodiments, synthesized human speech and/or input parameters 140 may be conveyed to user through chatbot system 148. In one or more embodiments, chatbot system 148 may record a user's interactions such as eye contact, the ability to focus and/or the like as communication datum 132 in order to populate input fields 124.

With continued reference to FIG. 1, processor 104 is configured to generate a user interface data structure 156. As used in this disclosure, "user interface data structure" is a data structure representing a specialized formatting of data on a computer configured such that the information can be effectively presented for a user interface. User interface data structure 156 may include any information as described in this disclosure, such as but not limited to input parameters 140, synthesize human speech, input fields 124, dynamic template 120 and/or the like. In one or more embodiments, user interface data structure 156 may include chatbot system 148 and/or instructions configuring remote device 128 to visually display a chatbot system 148. In one or more embodiments, user interface data structure 156 may include code in order to configure remote device 128 to display chatbot system 148. In one or more embodiments, user interface data structure 156 may contain and/or instructions to generate graphical and/or visualize graphical elements on remote device 128, such as but not limited to, images, videos, textual information and/or the like. In one or more embodiments, user interface data structure 156 may include the interface elements such as text boxes, buttons, visual designs and/or the like that the user interacts with. In one or more embodiments, user interface data structure 156 includes chatbot system 148 wherein user interface data structure 156 includes visual and/or interactive elements that allow for a user to communicate with chatbot system 148. In one or more embodiments, user interface data structure 156 may include visual and/or interactive components that allow for a user to seemingly communicate with chatbot system 148. This may include, but is not limited to, chat windows, input fields 124, buttons, icons and/or the like. In one or more embodiments, user interface data structure 156 may include avatars or icons which may be used to visualize chatbot system 148 on remote device 128. In one or more embodiments, user interface data structure 156 may include any visual representations that will allow for chatbot system 148 to be visualized on remote device 128. In one or more embodiments, chatbot system 148 may be located on system 100, wherein a user may interact with chatbot system 148 through user interface data structure 156.

With continued reference to FIG. 1, user interface data structure 156 may include a plurality of attributes 160 associated with dynamic template 120. An "attribute" for the purposes of this disclosure is a piece of data that gives information about something. In one or more embodiments, an attribute 160 may be associated with a "detail" attached to an object. For example and without limitation, attributes 160 associated with dynamic template 120 may include colors, themes, font size, and/or the like. In one or more embodiments, dynamic template 120 may include a plurality of attributes 160 such as, but not limited to, particular font sizes, particular colors, particular font selections and/or the like. In one or more embodiments, attributes 160 may include visual attributes 160 such as, but not limited to, size, color, font shape, opacity, alignment and/or the like. In one or more embodiments, attributes 160 may further include interactive attributes 160 which indicate how the user interacts with a user interface. For example, and without limitation, interactive attributes 160 may include clickable elements, draggable elements and/or the like. In one or more embodiments, attributes 160 include properties or characteristics that define the appearance and behavior of interface elements within a user interface. In one or more embodiments, receiving dynamic template 120 may include receiving attributes 160 associated with dynamic template 120.

With continued reference to FIG. 1, user interface data structure 156 may include a plurality of attributes 160 which define the appearance of chatbot system 148, input fields 124, dynamic template 120 and/or the like. In one or more embodiments, user interface data structure 156 may include a plurality of attributes 160 associated with dynamic template 120. In one or more embodiments, user interface data structure 156 may include a modified attribute associated with plurality of attributes 160. A "modified attribute" for the purposes of this disclosure is an attribute 160 that has been modified. For example, and without limitation, dynamic template 120 may include a plurality of attributes 160 wherein one or more attributes 160 may be modified. In one or more embodiments, processor 104 may modify attributes 160 in order to distinguish the identified input field 124 from the plurality of input fields 124. In one or more embodiments, one or more attributes 160 may be modified in order to indicate to distinguish a particular input field 124 from the plurality of input fields 124. In one or more embodiments, input fields 124 may contain similar attributes 160, such as fonts, colors and/or the like, wherein the identified input field 124 may include one or more modified attributes which distinguish the identified input field 124 from the plurality of input fields 124. In one or more embodiments, attributes 160 may be modified based on the identified input field 124. For example, without limitation, in instances in which processor 104 select a first input field 124, then attributes 160 associated with a first input field 124 may be modified. Continuing, if processor 104 then identifies a second input field 124, then the modified attributes associated with the first input field 124 may be reverted to ordinary attributes 160 and the attributes 160 associated with the second input field 124 may then be modified. In one or more embodiments, modified attributes may allow for a user to visually identify which input field 124 is currently being populated or will be populated. In one or more embodiments, modified attributes may include changes in font, changes in color, changes in layout, changes in size, changes in orientation and/or the like.

With continued reference to FIG. 1, user interface data structure 156 includes an input identifier 164. An "input identifier" as described in this disclosure is a visual element that identifies an input field 124 that was selected by processor 104. For example, and without limitation, input identifier 164 may include an image or an icon such as a checkmark near a selected input field 124 within a user interface in order to indicate to the user the input field 124 that processor 104 is seeking to populate. In one or more embodiments, input identifier 164 may include modified attributes. In one or more embodiments, input identifier 164 may include visual elements, such as arrows, images and/or the like that may be used to distinguish between the plurality of input fields 124 that may be displayed through a user interface. In one or more embodiments, input identifier 164 may include visual elements such as movement of input fields 124, thickened borders around inputs fields, highlighted input fields 124 and/or any other indicating that an input field 124 is currently being populated. In one or more embodiments, input identifier 164 may include a pulsating effect. Pulsating effect, for the purposes of this disclosure is a visual animation or transition where an element gradually changes in size, color, or opacity and then reverses or resets after a brief moment. This creates the illusion of the element "pulsing" or "breathing" by expanding and contracting (or changing in brightness). In one or more embodiments, texts borders and/or any other visual and/or textual elements associated with a selected input field 124 may "pulsate" in order to put a user on notice that the input parameters 140 received are associated with the specific input field 124. In one or more embodiments, input identifier 164 may transmission between input fields 124 based on the currently selected input field 124. For example, and without limitation, input identifier 164 may first be associated with a first input field 124, then in a subsequent iteration of the processing, be associated with a second input field 124.

With continued reference to FIG. 1, In one or more embodiments, user interface data structure 156 may include chatbot system 148, one or more input parameters 140, input identifier 164 associated with the at least one input field 124 of the plurality of fields and/or dynamic template 120. In one or more embodiments, user interface data structure 156 may include instructions on how a user interface should be rendered on remote device 128. In one or more embodiments, user interface data structure 156 may include layouts, styling, interactions, transitions, animations, event handlers and/or the like. In one or more embodiments, user interface data structure 156 may include instructions on how chatbot system 148, input parameters 140, input identifiers 164, input fields 124, dynamic templates 120 and/or the like should be displayed on remote device 128. In one or more embodiments, user interface data structure 156 may first be transmitted to remote device 128 on order to define the layout, design and the like of a user interface which will be used to display data. In one or more embodiments, information may be sent separately from user interface data structure 156. In one or more embodiments, user interface data structure 156 may define how a user interface and/or data is to be displayed on a device, such as remote device 128.

With continued reference to FIG. 1, each input parameter includes at least one metadata tag. A "metadata tag" for the purposes of this disclosure is a label or descriptor that provides additional information associated with a piece of data. For example, and without limitation, metadata tag may include a descriptor indicating if input parameter is a question, a response, a multiple choice question, an open ended question and/or the like. In one or more embodiments, metadata tag may dictate a behavior of a user interface data structure 156. In one or more embodiments, metadata tags may include the type of question an input parameter 140 is, a particular interactive element that should be displayed along with input parameter and/or the like. In one or more embodiments, metadata tag may indicate the format in which each input parameter should be presented to a user. For example, and without limitation, metadata tag may indicate that a text box should be displayed, a button or set of buttons should be displayed, a scrolling slide bar should be displayed, a drop down menu should be displayed and/or the use of any interactive elements and/or selectable event graphics as described in this disclosure. In one or more embodiments, metadata tags may dictate a behavior of user interface data structure 156 by dictating how input parameters should be presented and/or displayed using user interface data structure. In one or more embodiments, metadata tag may dictate a behavior of user interface data structure 156 by dictating how input parameters should be presented. In one or more embodiments, metadata may include a particular size font to be used, a particular color of font to be used, a particular font overall to be used and/or the like. In one or more embodiments, metadata may further indicate which portion of input parameters are questions and which portions are answers (e.g. multiple choice, drop down) that may be selected from. In one or more embodiments, metadata tags may further dictate interaction rules. "Interaction rules" for the purposes of this disclosure refer to how a user may interact with input parameters within a user interface. For example, and without limitation, metadata tags may dictate if an input parameter may be interacted with using clicks, typing, swiping, selection of a textbox and/or the like. In one or more embodiments, metadata tags may indicate a question type, wherein a particular interactive element from a set of interactive elements may be selected based on the question type. For example, without limitation, a question type may include multiple choice, true/false, fill in the blank and/or the like, wherein user interface data structure may be configured to provide input parameters based on their question type. In one or more embodiments, input parameters may dictate to user interface data structure and/or GUI how information should be presented. In one or more embodiments, each input parameter may be displayed and/or introduced in a differing way based on its associated metatag. In one or more embodiments, metadata tags may dictate the selectable event graphics and/or interactive elements to be used for, and/or associated with, each input parameter. In one or more embodiments, metadata tags may allow for improvement to a graphical user interface by allowing parameter machine learning model and/or LLM to dictate how information is presented within GUI. In one or more embodiments, metadata tags may include validation tags indicating if a question is mandatory to answer or option. In one or more embodiments, metadata tags may indicate to user interface the type of data that can be received. For example, and without limitation, metadata tag may be used to dictate if only numbers and/or characters should be used to answer a question.

With continued reference to FIG. 1, a machine learning model such as parameter machine learning model and/or LLM may generate metadata and/or generate input parameters including metadata tags. In one or more embodiments, outputs of the machine learning model may be used to create interface data structure and/or to modify user interface data structure upon generation of subsequent input parameters. In one or more embodiments, user interface data structure may be created as a function of at least the metadata tags, wherein information within user interface data structure may dictate how input parameters should be displayed based on their associated metadata tags. In one or more embodiments, a processing layer may map and format metadata tags into a structure in which the user interface data structure may understand. In one or more embodiments, the processing layer may act as an intermediary between the machine learning model's output (input parameter and metadata tag) and the user interface (UI). In one or more embodiments, processing layer may be configured to transform, validate, and structure the data so that the UI can effectively use it to display the question and handle interactions. IN one or more embodiments, the processing layer may convert metadata into a structured format that the UI understands, such as for example, objects with properties (e.g., option_id, option_label). In one another non limiting example, for multiple-choice questions, processing layer may ensure that the question text, options, and interactions are packaged into an object that the UI can easily process. In one or more embodiments, processing layer may further be configured to validate the interactions and/or interactive elements. For example, and without limitation, the processing layer may ensure that a question requiring a click response may actually be converted into a click response. In one or more embodiments, processing layer may ensure that the metadata tags that are provided along with the input parameters can actually be implemented. For example, and without limitation, a metadata tag dictating that a multiple choice question format should be used may be deemed to be invalid if the input parameter did not include exemplary answers in which a user may choose from. In one or more embodiments, interactions within input parameters within a user interface may be received as communication datum.

With continued reference to FIG. 1, metadata tags may dictate how chatbot system provides information to a user. For example, and without limitation, metadata tags may dictate that information is to be asked in the form of multiple choice, in the form of a sliding bar, in the form of checkboxes and/or the like. In one or more embodiments, each input parameter of the one or more input parameters includes a metadata tag that dictates a behavior of the user interface data structure. In one or more embodiments, interaction with interactive elements, text boxes, selectable event graphics and/or the like generated as a function of the metadata tags may be recoded as communication datum. In one or more embodiments, communication datum may include any interaction with visual elements generated within the user interface as a function of the metadata tags. In one or more embodiments, user interface data structure may be generated as a result of the metadata tags.

With continued reference to FIG. 1, processor 104 may be configured to transmit the user interface data structure 156 to a graphical user interface. In one or more embodiments, graphical user interface may be located on remote device 128. Transmitting may include, without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 104 may transmit the data described above to database 116 wherein the data may be accessed from database 116. Processor 104 may further transmit the data above to a device display or another computing device 104. In one or more embodiments, transformations, modifications and the like made to whole slide image and/or digital slide may be placed within user interface data structure 156 in order to be visualized through a user interface. In one or more embodiments, user interface data structure 156 may inform the graphical user interface on how to display the elements by providing layout, styling, and behavior instructions. Once received, a Graphical user interface rendering engine (or framework) interprets this data and uses it to generate the graphical interface.

With continued reference to FIG. 1, system 100 may include a graphical user interface (GUI). For the purposes of this disclosure, a "user interface" is a means by which a user and a computer system interact. For example, through the use of input devices and software. In some cases, processor 104 may be configured to modify graphical user interface as a function of the user interface data structure 156. A user interface may include graphical user interface, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 104. For example, remote device 128 such as a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry 198 device. A "graphical user interface," as used herein, is a user interface that allows users to interact with electronic devices through visual representations. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface. Persons skilled in the art, upon reviewing the entirety of this disclosure, will be aware of various ways in which a graphical user interface and/or elements thereof may be implemented and/or used as described in this disclosure.

With continued reference to FIG. 1, GUI may contain one or more interactive elements. An "interactive element" for the purposes of this disclosure is an element within a graphical user interface that allows for communication with apparatus by a user. For example, and without limitation, interactive elements may include push buttons wherein selection of a push button, such as for example, by using a mouse, may indicate to system to perform a particular function and display the result through graphical user interface. In one or more embodiments, interactive element may include push buttons on GUI, wherein the selection of a particular push button may result in a particular function. In one or more embodiments, interactive elements may include words, phrases, illustrations and the like to indicate the particular process the user would like system to perform. In one or more embodiments, interaction with interactive elements may result in the generation of communication datum 132. In one or more embodiments, GUI may be configured to visualize chatbot systems 148, dynamic template 120 and/or other information within user interface data structure 156.

With continued reference to FIG. 1, system 100 may further include a display device communicatively connected to at least a processor 104. A "display device" for the purposes of this disclosure is a device configured to show visual information. In some cases, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In some cases, display device may be configured to visually present one or more data through GUI to a user, wherein a user may interact with the data through GUI. In some cases, a user may view GUI through display device and/or remote device 128.

With continued reference to FIG. 1, processor 104 is configured to construct user interface data structure 156 and/or modify an existing user interface data structure 156 as described above. In one or more embodiments, user interface data structure 156 may include information that may be used to configure remote device 128 to visually display chatbot system 148, dynamic template 120 and/or the like on remote device 128. In one or more embodiments, user interface data structure 156 may be transmitted to remote device 128, wherein user interface may be displayed on remote device 128. In one or more embodiments, processor 104 may be configured to configure remote device 128 to generate a graphical view 168 as a function of user interface data structure 156. As used in this disclosure, a "graphical view" is a data structure that causes display of one or more graphical elements on a remote device 128 such as remote device 128. For example, and without limitation, graphical view 168 may include a visual presentation of graphical elements such as images, texts, icons, shapes and/or the like that are displayed to a user on a screen of remote device 128. In one or more embodiments, graphical elements may include buttons that a user may interact with, textual information and/or the like. In one or more embodiments, graphical view 168 may include information organized within a graphical user interface and configured to facilitate interaction with a graphical user interface. In one or more embodiments, graphical view 168 may include the display of chatbot system 148, the display if dynamic template 120 and/or the display of any other information within user interface data structure 156. In one or more embodiments, processor 104 may be configured to configure remote device 128 to generate a graphical view 168 within graphical user interface. In one or more embodiments, graphical view 168 may include a single visual representation within an application or system that displays specific graphical elements to the user. In one or more embodiments, graphical view 168 may include any information as described in this disclosure which is structured within a particular format suitable for user interaction. In one or more embodiments, a graphical user interface may include a plurality of graphical views 168 wherein each graphical view 168 may be generated as a function of information generated by processor 108.

With continued reference to FIG. 1, graphical view 168 may include a display element. A "display element," as used in this disclosure, is an image or set of images that a program or data structure may cause to be displayed on a display of a remote device 128 such as first remote device 128. Display elements may include, without limitation, windows, pop-up boxes, web browser pages, display layers, and/or any other display element that may occur to a person skilled in the art upon reviewing the entirety of this disclosure. In one or more embodiments, display element may include a virtual avatar 152, a chatbot system 148 and/or the like. In one or more embodiments, graphical view 168 may include display element wherein graphical view 168 may display virtual avatar 152 and/or chatbot through GUI. In one or more embodiments, graphical view 168 may include at least a display element generated as a function of chatbot system 148, input parameters 140, dynamic template 120 and/or the like. In one or more embodiments, display element may be generated as a function of input parameters 140 wherein display element may include textual and/or visual information associated with input parameters 140. In one or more embodiments, graphical view 168 may further include a first selectable event graphic 172 corresponding to a first selectable event handler 176. A "selectable event graphic," as used in this disclosure, is a graphical element that, upon selection, is configured to trigger an action to be performed. In one or more embodiments, selection may de done using a cursor or other locater as manipulated using a locater device such as a mouse, touchscreen, trackpad, joystick and/or the like. As a non-limiting example, a selectable event graphic 172 may include a button or checkbox used to indicate an agreement of a particular populated input field 124. In one or more embodiments selectable event graphics 172 may include interactive elements that allow a user to select, through a user interface, input fields 124, text boxes, and/or the like. In one or more embodiments, graphical view 168 may include selectable event graphics 172 that allow a user to interact with GUI. In one or more embodiments, selectable event graphics 172 may include input fields 124, wherein a user may select a particular input field 124. In one or more embodiments, processor 104 may generate selectable event graphics 172 for each input field 124. In one or more embodiments, selection of an input field 124 may notify processor 104 that a user would like to provide feedback associated with a particular populated input field 124. In one or more embodiments, selection of a selectable event graphic 172 may trigger processor 104 to generate a popup window, a text bods and/or the like in which a user may provide feedback.

With continued reference to FIG. 1, selectable event graphic 172 corresponds to a selectable event handler 176. A "selectable event handler" as described in this disclosure is an event handler associated with selectable event graphic 172. An "event handler," as used in this disclosure, is a module, data structure, function, and/or routine that performs an action on remote device 128 in response to a user interaction with selectable event graphic 172. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like. Event handler may transmit data from remote device 128 to computing device 104 and/or processor 104. In one or more embodiments, event handler may allow for interaction by an individual with remote device 128. In one or more embodiments, an individual such as a user of remote device 128 may interact with remote device 128 to trigger event handler. In one or more embodiments, user interactions with remote device 128 may include, but are not limited to, the inputting of information, interaction with a user interface and/or the like. In one or more embodiments, event handler may cause processor 104 to perform one or more actions in response to user interactions. In one or more embodiments, selectable event handler 176 may be triggered upon interaction and/or selection of selectable event graphic 172. In one or more embodiments, selectable event handler 176 may include instructions to generate data, retrieve data, process information, display information and/or the like. In one or more embodiments, selectable event handler 176 may include instructions to transmit communication datum 132 to processor 104. In one or more embodiments, selectable event handler 176 may include instructions to provide feedback to outputs generated by large language model. In one or more embodiments, each selectable event handler 176 may be associated with a differing input field 124. In one or more embodiments, each selectable event graphic 172 may notify processor 104 that a particular input field 124 has been selected wherein selectable event handler 176 may trigger a popup window, transmit information to processor 104 and/or the like.

With continued reference to FIG. 1, in one or more embodiments, selectable event handler 176 may be configured to trigger event actions 180 upon interaction of selectable event graphic 172. An "event action" as described in this disclosure is an operation or set of operations performed by a computing device 104 in response to an event. In one or more embodiments, event action 180 may include the transmission of information to processor 104 and/or LLM 144. For example and without limitation, event action 180 may include the transmission of feedback to processor 104 and/or LLM 144 indicating that the population of an input field 124 was incorrect. In one or more embodiments, event actions 180 may include a selection indicating to processor 104 that a user is communicating information associated with the selected input field 124. In one or more embodiments, event action 180 may include any action as described in this disclosure. In one or more embodiments, selectable event handler 176 may further trigger event actions 180 such as the selection of an input field 124 which would indicate to processor 104 that an input field 124 has been selected in order to provide feedback. In one or more embodiments, selectable event graphic 172 may trigger an action to repopulate an input field 124. In one or more embodiments selection of selectable event graphic 172 may trigger an event action 180 to notify processor 104 and/or LLM 144 to repopulate one or more input fields 124 based on incorrect information. In one or more embodiments, selectable event handler 176 may trigger event actions 180 such as, for example, generation of responses by LLM 144, generation of responses by virtual avatar 152, the display of information and/or the like. In one or more embodiments, selectable event handler 176 may be configured to trigger event actions 180 on processor 104.

With continued reference to FIG. 1, event action 180 may be triggered upon interaction of selectable event graphic 172. In one or more embodiments, event action 180 may include preconfigured processes that are to be performed by processor 104. In one or more embodiments, event actions 180 may be used to identify whether an input provided by processor 104 and/or LLM 144 is correct or incorrect. In one or more embodiments, event action 180 may be triggered upon an input made by remote device 128. In one or more embodiments, input made by remote device 128 may be made by interacting with user interface and/or one or more selectable event graphics 172. In one or more embodiments, event actions 180 may include actions to trigger the display of additional information within input fields 124. For example, and without limitation, processor 104 may provide alternative inputs within input fields 124. In one or more embodiments, event actions 180 may include an operation to communicate with an LLM 144 to generate communications made in response to inputs made by a user, for example, and without limitation, a user may input "can you clarify?" wherein event action 180 may trigger LLM 144 to provide a response. In one or more embodiments, event actions 180 may include operations to communicate with a chatbot system 148 connected to LLM 144. In one or more embodiments, processor 104 may be configured to generate a graphical view 168 including one or more selectable event graphics 172 corresponding to one or more selectable event handler 176, wherein each selectable event handler 176 is configured to trigger at least one event action 180 upon interaction of the selectable event graphic 172 and wherein each selectable event handler 176 is associated with at least one input field 124.

With continued reference to FIG. 1, graphical view 168 may include a first display window 184. For the purposes of this disclosure, a "display window" is a defined visual area within a display. For example, without limitation, display window 184 may include a defined rectangular area on a display wherein display elements may be display within the rectangular area. In one or more embodiments, display window 184 may include a defined border and/or perimeter wherein display elements, selectable event graphics 172 and/or the like. In one or more embodiments, display windows may isolate graphical elements from one another. In one or more embodiments, graphical view 168 may include a first display window 184 visualizing the chatbot system 148 and a second display window 184 visualizing the dynamic template 120. In one or more embodiments, first display window 184 and second display window 184 may be situated adjacent to one another in order to allow a user to view first display window 184 and second display window 184 on a single display screen. In one or more embodiments, a single display screen on remote device 128 may show multiple display windows simultaneously. In one or more embodiments, a user may interact with chatbot system 148 through one display window 184 and visually see dynamic template 120 and/or inputs made to dynamic template 120 in second display window 184. In one or more embodiments, use of multiple display windows may allow for removal of various display elements from display screen while allowing other display elements to be present. For example, and without limitation, a user may have the option to remove the display window 184 visual chatbot system 148 in order to signify to processor 104 to cease communication with chatbot system 148. Continuing, the display window 184 visualizing dynamic template 120 may remain present in order to allow for a user to view dynamic template 120, modify dynamic template 120 and/or save dynamic template 120 locally. In one or more embodiments, display windows may include defined borders and/or edges to signify to a user the perimeters of each display window 184. In one or more embodiments, graphical view 168 may include multiple display windows, wherein each display window 184 may display differing display elements.

With continued reference to FIG. 1, processor 104 is configured to receive communication datum 132 from remote device 128. In one or more embodiments, interactions with GUI and/or graphical view 168 may be recorded as communication datum 132. In one or more embodiments, communication datum 132 may include selection of selectable event handler 176*s*, interactive elements, the input of information using a keyboard, microphone and/or the like. In one or more embodiments, communication datum 132 may include selection of input fields 124 through the selection of selectable event graphics 172. In one or more embodiments, communication datum 132 may include interactions with remote device 128, such as for example, eye contact, the slurring of words, lack of focus and/or the like. In one or more embodiments, processor 104 may be configured to record and/or note a user's conscious and/or subconscious reactions, movements and/or the like. In one or more embodiments, physical movements and/or other interactions may provide information as to a user's personality, weaknesses and/or other physiological and/or mental information that may be used to populate input fields 124. In one or more embodiments, remote device 128 may include a video input device such as a camera, wherein the camera may be configured to record a user's movements, interactions and/or the like. In one or more embodiments, hesitation between answers may be recorded, lack of grammar may be recorded and/or the like.

With continued reference to FIG. 1, chatbot system 148 may communicate to user either through text, through synthesized text-to-audio speech and/or both. In one or more embodiments, a user may respond through vocal speech. In one or more embodiments, communication datum 132 may include audio that has been recorded from remote device 128. In one or more embodiments, any audio from remote device 128 may be received as communication datum 132. In one or more embodiments, remote device 128 may include an input device as a microphone, wherein remote device 128 may record a user's speech as communication datum 132.

With continued reference to FIG. 1, processor 104 may receive communication datum 132 as an audio, a text input, a selection within a graphical view 168 and/or graphical user interface, an interaction with remote device 128 and/or the like. In one or more embodiments, processor 104 may be configured to use automatic speech recognition processes in order to convert audio into text-based speech which may be processed by processor 104 and/or LLM 144. In one or more embodiments, processor 104 may receive communication datum 132 and utilize an automatic speech recognition model to convert the user's speech into text-based communications that may be processed by processor 104 and/or LLM 144.

Still referring to FIG. 1, in some embodiments, automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by computing device 104. Computing device 104 may then train an automatic speech recognition model according to training data which includes audible verbal content correlated to known content. In this way, computing device 104 may analyze a person's specific voice and train an automatic speech recognition model to the person's speech, resulting in increased accuracy. Alternatively or additionally, in some cases, computing device 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics-indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 4-6. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, communication datum 132 may include a data response 188 and a feedback element 192. A "data response" for the purposes of this disclosure is a response given to one or more input parameters 140 provided by processor 104. For example, and without limitation, one or more input parameters 140 may include "what is your name" wherein data response 188 may include "Eric." In one or more embodiments, input parameters 140 may include requests to seek information related to one or more input fields 124 wherein data response 188 may include a communication by user in order to provide information associated with the input parameters 140 and/or input fields 124. In one or more embodiments, a user may visually see dynamic template 120 and input identifier 164, wherein a user may visually receive context as to which input field 124, the input parameters 140 relate to. For example, without limitation, an input field 124 associated with a name may contain an input identifier 164 such as a pulsating effect, wherein a user may understand that the current questions, requests and/or input parameters 140 provided through chatbot system 148 may be associated with the input field 124 associated with the name. Continuing, when subsequent input parameters 140 are provided for a subsequent input field 124, a user may see that the input identifier 164 has been assigned to a subsequent input field 124 and thereby answer questions in the context of the subsequent input field 124. A "feedback element" for the purposes of this disclosure refers to information in the form of suggestions or corrections that a user provides to system 100. For example, and without limitation, feedback element 192 may include a phrase such as "sorry, I misspoke, my weakness is actually organization". In such an instance, processor 104 may understand that the phrase is a feedback element 192 and is to be used to correct information within communication datum 132 and/or to correct information generated as a result of a previous communication datum 132. In one or more embodiments, feedback element 192 may indicate to processor 104 that a particular set of information within a current communication datum 132 and/or a previously received communication datum 132 was incorrect. In one or more embodiments, feedback element 192 may be used to indicate that the information used to populate an input field 124 was incorrect and therefore should be repopulated. In one or more embodiments, feedback element 192 may further include suggestions by a user to repopulate input field 124 with a differing set of information, even though the information within the populated input fields 124 was accurate. For example, and without limitation, a user may indicate "while this is my weakness, I would prefer for it not to be documented within an input field 124" as a result, processor 104 may remove such information from the populated input field 124 and regenerate information.

With continued reference to FIG. 1. Processor 104 may receive communication datum 132 and distinguish between data responses 188 and feedback elements 192. For example, and without limitation, processor 104 may identify "my name is . . . " as a data response 188 while information such as "I don't believe that . . . is my weakness. In one or more embodiments, processor 104 may transmit communication datum 132 to LLM 144, wherein LLM 144 may identify and/or distinguish data responses 188 and feedback elements 192. In one or more embodiments, LLM 144 may use the previously transmitted input parameters 140 as context in order to understand which information may be classified as data responses 188 and which information may be classified as feedback elements 192. For example, and without limitation, using a previously transmitted input parameter 140 associated with a user's career, LLM 144 may classify any information associated with a career as a data response 188 and all other information as feedback elements 192. In one or more embodiments, LLM 144 may be configured to identify key words that may be used to identify feedback elements 192. For example, and without limitation, key words such as "not accurate," "that isn't correct," "the previous input field 124" and/or the like may indicate to LLM 144 that the information is pertaining to a feedback element 192. In one or more embodiments, LLM 144 may utilize input parameters 140 from each current iteration of the processing in order to distinguish between feedback elements 192 and data response 188. In one or more embodiments, processor 104 may be configured to transmit communication datum 132 and input parameters 140 as an input to LLM 144 and receive classification of elements within communication datum 132. IN one or more embodiments, LLM 144 may first utilize the transmitted input parameters 140 in order to identify data responses 188. In one or more embodiments, LLM 144 may then utilize other previously transmitted input parameters 140 (e.g. input parameters 140 transmitted on a previous iteration of the processing) in order to identify the particular input field 124 in which the feedback element 192 applies to. For example and without limitation, remaining information within communication datum 132 that has not been identified as a data response 188 may be identified to be associated with a previous input field 124 based on its connection to previous input parameters 140 transmitted. As a result, LLM 144 may identify such information as feedback elements 192 and utilize the feedback elements 192 to modify previously populated input fields 124.

With continued reference to FIG. 1, processor 104 may use a classifier such as input classifier to classify elements within communication datum 132 as data response 188 and/or feedback elements 192. In one or more embodiments, input classifier may receive as an input, communication datum 132 and output input classifications 136 for elements within classification datum. In one or more embodiments, elements within classification datum having the same label and/or grouping as the transmitted input parameters 140 may be identified as data responses 188 and elements associated with other input classifications 136 may be identified as feedback elements 192. In one or more embodiments, elements not classified to any input classifications 136 may be disregarded as they may be ancillary to any input fields 124. In one or more embodiments, feedback elements 192 may be used to train input classifier. In one or more embodiments, feedback elements 192 may be used to adjust parameter values of input classifier. In one or more embodiments, a user may unknowingly train a machine learning model such as input classifier, by providing feedback elements 192 in the form of communication datum 132. In one or more embodiments, phrases such as "I believe that information is in the wrong input field 124" may indicate to processor 104 that the input field 124 may have been improperly classified and as a result, include information that is unassociated with the input field 124. In one or more embodiments, a user may view through graphical view 168 the population of input fields 124 in real-time wherein a user may provide feedback immediately in order to ensure that subsequent input fields 124 are properly classified and properly populated.

With continued reference to FIG. 1, it may be the case that a communication datum 132 may include information vital to a future input field 124. In one or more embodiments, processor 104 may receive communication datum 132, classify elements of communication datum 132 to one or more input classifications 136 using input classifier and segment communication datum 132 into one or more input groupings 196 as a function of the classification. In one or more embodiments, communication datum 132 may be separated and/or segmented into multiple input groupings 196. In one or more embodiments, input groupings 196 containing the same classification as the currently transmitted input parameters 140 may be identified as data responses 188. In one or more embodiments, processor 104 may select the input grouping 196 containing the same classification and label it as a data response 188. In one or more embodiments, the select input grouping 196 may be labeled as a data response 188. In one or more embodiments, data entries (as described herein) may be generated as a function of the input grouping 196. In one or more embodiments, input field 124 may be populated as a result of the input grouping 196. This is described in further detail below. In one or more embodiments, input groupings 196 containing the same classification as previously transmitted input parameters 140 and may be used as feedback elements 192 for their associated input field 124. In one or more embodiments, other input groupings 196 may be selected and labeled as feedback elements 192 along with the input field 124 in which they correlate with. In one or more embodiments, elements that have not yet been classified to an input grouping 196 may be saved within a local memory and used in a future interaction in order to populate future input fields 124. For example, and without limitation, communication datum 132 may include information about an individual's career. However such information may not pertain to the current input field 124 and/or previously populated input fields 124. In one or more embodiments, processor 104 may retain such information and utilize such information when identifying data response 188 and feedback elements 192 in future interactions. For example, and without limitation, an input parameter 140 may relate to an individual's career wherein the previously received communication datum 132 may be identified as a current data response 188. In one or more embodiments, all communication datums 132 from previous interactions may be retained in order to use such information for future input fields 124. In one or more embodiments, processor 104 and/or LLM 144 may iteratively aggregate communication datums 132 and use the aggregated communication datums 132 to generate data responses 188 and feedback elements 192 in future iterations.

With continued reference to FIG. 1, processor 104 may use communication datum 132 to populate input fields 124. In one or more embodiments, processor 104 may use data response 188 to populate input fields 124. In one or more embodiments, processor 104 may generate a data entry 198 for the input field 124 based on the data response 188. A "data entry" for the purposes of this disclosure refers to the information that is placed within an input field 124. For example, and without limitation input field 124 may be associated with a name where data entry 198 may include the user's name. In one or more embodiments, processor 104 may generate a separate data entry 198 for each input field 124. In one or more embodiments, populated input fields 124 may include data entries. In one or more embodiments, data entries may include data responses 188 that have been refined and/or modified in order to properly address an input field 124. For example, and without limitation, a data response 188 such as "I design and build websites for small businesses, handling everything from layout to backend functionality," may be modified to a data entry 198 indicating "web developer." In one or more embodiments, data entries may include modified data responses 188 that properly address a requirement and/or topics within an input field 124. In one or more embodiments, LLM 144 may receive an input grouping 196 and generate data entry 198 in order to populate input field 124. In one or more embodiments, processor 104 may use a machine learning model and/or LLM 144 In order to input data responses 188 and receive data entries. In one or more embodiments, LLM 144 and/or a machine learning model may be trained and/or configured to categorize information, classify information, perform task-to-goal mapping, utilize semantic reasoning and/or the like in order to generate data entries associated with their correlated input field 124. In one or more embodiments, in instances in which data entries require one word or minimal responses, such as names, a direct matching function may be used wherein a name or other information may be extracted from data response 188 and used as a data entry 198 within input field 124. In one or more embodiments, LLM 144 may use natural language processing, semantic matching and/or rule based extraction in order to create data entries for input fields 124. In one or more embodiments, LLM 144 may use interactions within GUI in order to generate data entries. For example, and without limitation, a lack of eye contact may be document, proper posture may be documented, hesitation and/or a lack thereof may be documented and/or the like. In one or more embodiments, processor 104 may use LLM 144 to generate data entries and populate input fields 124.

With continued reference to FIG. 1, processor 104 may generate modified data entries. A "modified data entry 198" for the purposes of this disclosure refers to a previously generated data entry 198 that has been modified. In one or more embodiments, modified data entries may be used to correct information in which a user deems to be inaccurate and/or undesirable. In one or more embodiments, processor 104 may generate data entries and populate input fields 124. In one or more embodiments, a user may provide feedback within communication datum 132 as feedback elements 192, wherein feedback elements 192 may be used to modify data entries. In one or more embodiments, an LLM 144 may receive previous data entries and the feedback elements 192 in order to create modified data entries. In one or more embodiments, feedback elements 192 may further be used to iteratively train input classifier, wherein feedback elements 192 may be used to ensure that input fields 124 and/or communication datum 132 are properly classified with respect to populating future input fields 124. In one or more embodiments, processor 104 may simultaneously create data entries for currently identified input fields 124 and modify data entries of previous input fields 124. In one or more embodiments, LLM 144 may be configured to use feedback element 192 to alter and/or other data entries containing similar information. For example, and without limitation, all data entries containing a name may be modified in instances in which feedback element 192 indicates that names are incorrect. In one or more embodiments, LLM 144 may use data response 188 to generate a data entry 198 and use feedback elements 192 from current and previous iterations to ensure that the data entry 198 is accurate. In an embodiments, LLM 144 may preserve feedback elements 192 to ensure that inaccuracies don't occur in future data entries when populating input fields 124. In one or more embodiments, LLM 144 may iteratively and/or continuously store feedback elements 192 and use feedback elements 192 to ensure that subsequent data entries are accurate. For example, and without limitation, in instances in which a communication datum 132 indicates "please don't mention my stutter," LLM 144 may use such feedback in subsequent data entries to ensure that they do not discuss a stutter. In one or more embodiments, LLM 144 may further use previous data entries that may contain information associated with the current input fields 124. In one or more embodiments, data entries may be populated within graphical view 168 in real-time, wherein a user may provide, through communication datum 132, feedback on whether the data entries are accurate or inaccurate. In on or more embodiments, processor 104 may utilize LLM 144 and/or a machine learning model to generate data entries from data responses 188 and to generate modified data entries using feedback elements 192. In one or more embodiments, dynamic template 120 may already be populated with data entries generated from previously transmitted input parameters 140. In one or more embodiments, such data entries may be modified and repopulated within the input field 124. In one or more embodiments, on a first iteration of the processing, feedback elements 192 may be used as parameters for current and subsequent data entries. For example, and without limitation, feedback elements 192 may include suggestions not to include certain terms, suggestions not to include certain facts, suggestions not to include certain personal information and/or the like. In one or more embodiments, feedback elements 192 may be used to limit the type of information that may be generated in a current, previous and/or future data entry 198.

With continued reference to FIG. 1, processor 104 may be configured to receive communication datum 132, transmit communication datum 132 to LLM 144, receive data entry 198 and/or modified data entry 198 and dynamically modify user interface data structure 156 as a function of data entry 198 and/or modified data entry 198. As described herein "dynamically modifying" a user interface data structure 156 refers to a process in which information within the user interface data structure 156 is removed or changed in real-time based on information contained within communication datum 132. For example and without limitation, user interface data structure 156 may be dynamically modified to include new data entries, modified data entries to replace older data entries and/or the like. In one or more embodiments, user interface data structure 156 may be dynamically modified in order to visually present newly generated data entries and/or modified data entries to remote device 128 and subsequently to user. In one or more embodiments, user interface data structure 156 may be dynamically modified to include data entry 198 and/or a visualization thereof. In one or more embodiments, input fields 124 may be populated with data entries wherein a user may view, in real-time newly added data entries and/or changes to data entries. In one or more embodiments, modified data entries may be accompanied by input identifiers 164 in order to notify the user that a previous input fields 124 have been altered or changed. In one or more embodiments, input identifiers 164 associated with previous input fields 124 that have modified data entries may contain differing visualizations from that of input identifiers 164 associated with populating current input fields 124. In one or more embodiments, input identifiers 164 may include a change in font color such that graphical view may visually notify a user that changes have been made to various input fields 124. In one or more embodiments, input identifiers 164 for modified data entries may remain temporarily until a subsequent communication datum 132 is received.

With continued reference to FIG. 1, in one or more embodiments, dynamically modifying user interface data structure 156 may include dynamically modifying dynamic template 120. In one or more embodiments, user interface data structure 156 may be modified to include currently generated data entries, modified data entries and input identifiers 164 indicating an addition and/or modification. In one or more embodiments, modifications may only be made within the display window 184 displaying dynamic template 120.

With continued reference to FIG. 1, user interface data structure 156 may be modified as a function of communication datum 132, wherein data entries may be modified, added and/or the like. In one or more embodiments, upon generation of data entry 198, processor 104 may be configured to identify a subsequent input field 124 that now requires populating (wherein populating refers to the generation of a data entry 198 for said input field 124). In one or more embodiments, input identifier 164 may be removed from user interface data structure 156 in order to notify a user that data entry 198 has been created, and processor 104 may be identifying a subsequent data entry 198 for populating. In one or more embodiments, modifying user interface data structure 156 may include appending a subsequent input identifier 164 associated with a subsequent input field 124 of the plurality of input fields 124. A "subsequent input identifier" as described herein refers to an input identifier 164 used on a subsequent input field 124. In one or more embodiments, input identifiers 164 may be removed once the input field 124 has been populated. In one or more embodiments, processor 104 may append a subsequent input identifier 164 that is associated with a subsequent input field 124 in order to put a user on notice that the next set of generated input parameters 140 will be associated with the next input field 124. In one or more embodiments, input identifiers 164 may 'attach' to subsequent input fields 124 in order to visually notify a user that the previous input field 124 has been populated and now processor 104 will be generating data entries for the next input field 124. In one or more embodiments, processor 104 may dynamically modify user interface data structure 156 to include data entries, modified data entries and input identifiers 164 that have now been attached to 'new' input fields 124.

With continued reference to FIG. 1, in one or more embodiments, once all input fields 124 have been populated with data entries, processor 104 may be configured to transmit dynamic template 120, including data entries to remote device 128. In one or more embodiments, processor 104 may be configured to convert dynamic template 120 into a digital document, wherein the digital document is populated with generated data entries.

Figure 2:
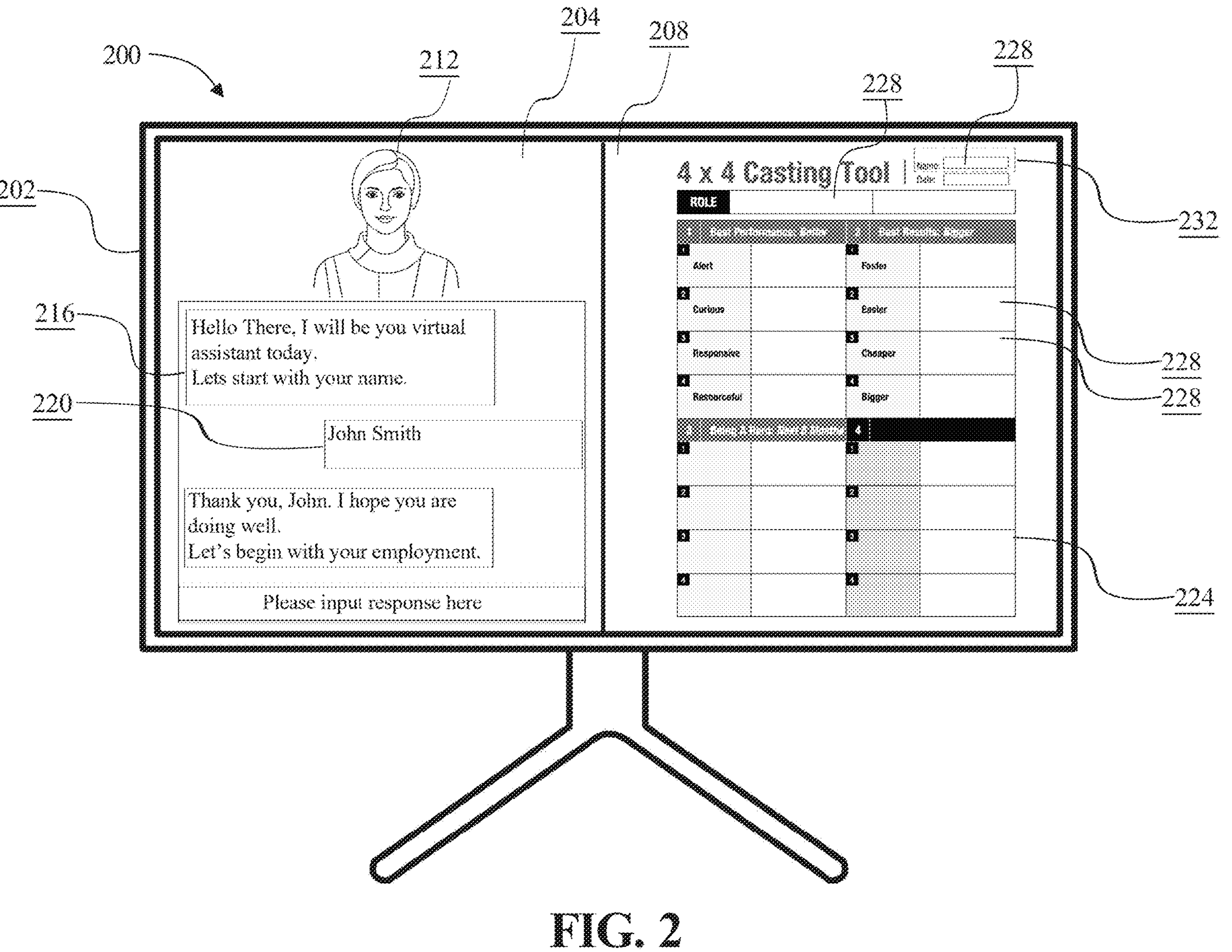
FIG. 2 is an exemplary embodiments of a graphical view.

Referring now to FIG. 2, an exemplary embodiment of a graphical view 200 is described. In one or more embodiments, graphical view may be displayed on a display device 202. In one or more embodiments, display device 202 may include any device and/or remote device as described in this disclosure. In one or more embodiments, graphical view 200 may include a first display window 204 and a second display window 208. In one or more embodiments, both first display window 204 and second display window 208 may include distinct borders separate both display windows. In one or more embodiments, first display window may be configured to display a virtual avatar 212. In one or more embodiments, virtual avatar may include a chatbot system as described in reference to at least FIG. 1. In one or more embodiments, virtual avatar 212 may be used to communicate with an individual. In one or more embodiments, a system as described in reference to FIG. 1, may be configured to generate input parameters wherein input parameters may be used to communicate and receive information from an individual. In one or more embodiments, virtual avatar 212 may be configured to transmit requests 216 to a user. In one or more embodiments, requests 216 may include requests for information. In one or more embodiments, requests may include input parameters associated with a particular input field 228. In one or more embodiments, responses 220 by a user may be used to communicate with virtual avatar 212. In one or more embodiments, responses 220 may include communication datum as described in reference to at least FIG. 1. In one or more embodiments, a computing device may receive responses 220 as communication datum in order to populate input fields 228.

With continued reference to FIG. 2, graphical view 200 may include second display window 208. In one or more embodiments, second display window 208 may be situated adjacent to first display window 204. In one or more embodiments, second display window 208 may be configured to visually display dynamic template 224. In one or more embodiments, dynamic template may include a plurality of input fields 228. In one or more embodiments, a computing device, through the use of virtual avatar 212 may be configured to populate input fields by transmitting input parameters to a user and receiving communication datum. In one or more embodiments, graphical view 200 and/or second display window 208 may further display an input identifier 232. In one or more embodiments, input identifier may be used to indicate the particular input field 228 in which the virtual avatar 212 and/or computing device is seeking to populate. In this instance, input identifier 232 may include a dashed border around the select input field 228. In one or more embodiments, a user may simultaneously communicate with virtual avatar 212 while at the same time monitoring the populating of dynamic template. IN one or more embodiments, a user may provide feedback to inputs within input fields 228 through responses 220. In one or more embodiments, a user may further provide feedback through selection of input fields and the manual input of data within the input field 228.

Figure 3:
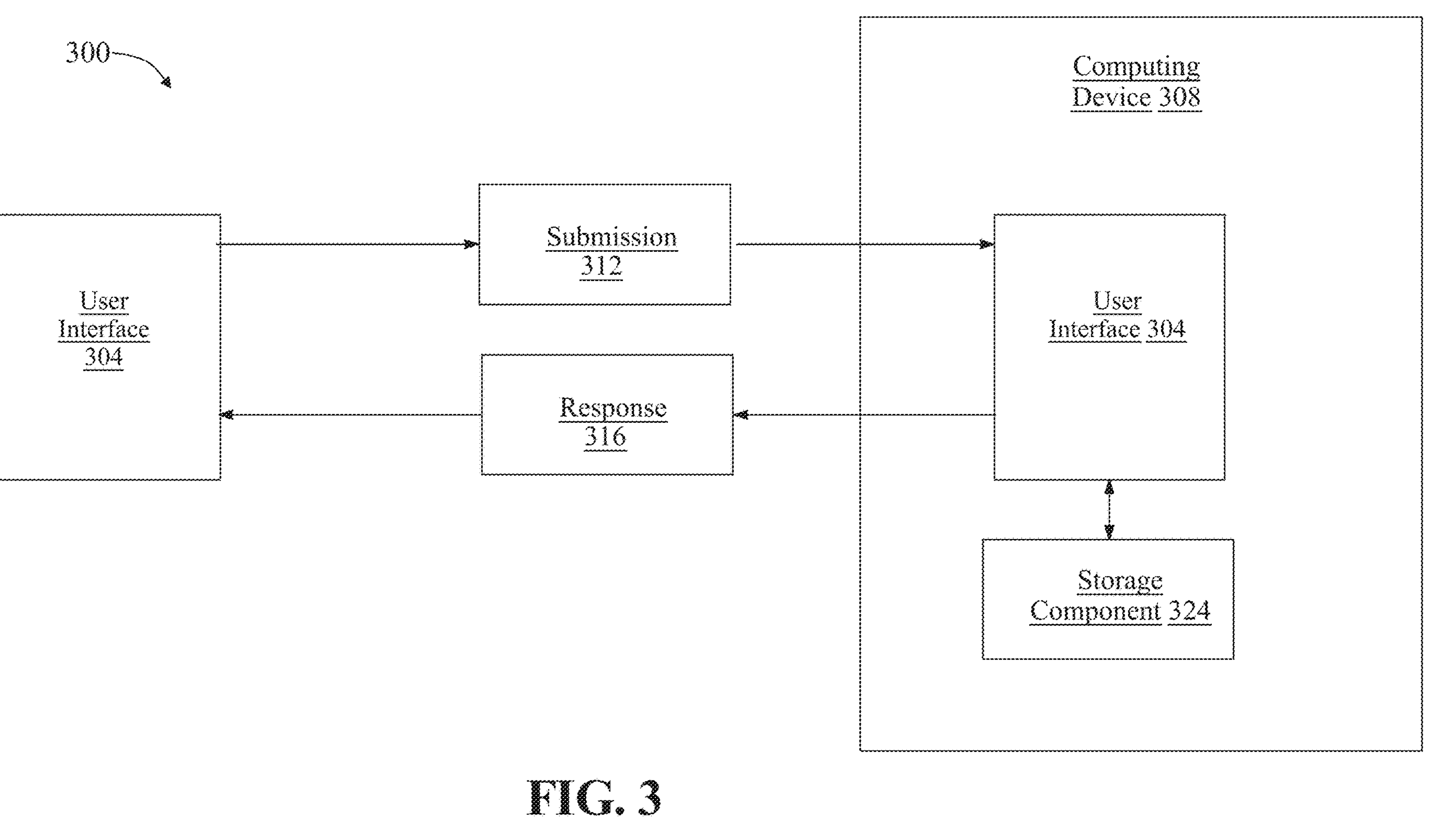
FIG. 3 is a block diagram of exemplary embodiment of a chatbot.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 304 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor. In some embodiments, processor processes a submission 312 using one or more of keyword recognition, pattern matching, and natural language processing. In some embodiments, processor employs real-time learning with evolutionary algorithms. In some cases, processor may retrieve a pre-prepared response from at least a storage component 324, based upon submission 312. Alternatively or additionally, in some embodiments, processor communicates a response 316 without first receiving a submission 312, thereby initiating conversation. In some cases, processor communicates an inquiry to user interface 304; and the processor is configured to process an answer to the inquiry in a following submission 312 from the user interface 304. In some cases, an answer to an inquiry present within a submission 312 from a user device may be used by computing device 104 as an input to another function, for example without limitation as an input to LLM and/or an input to course module.

Figure 4:
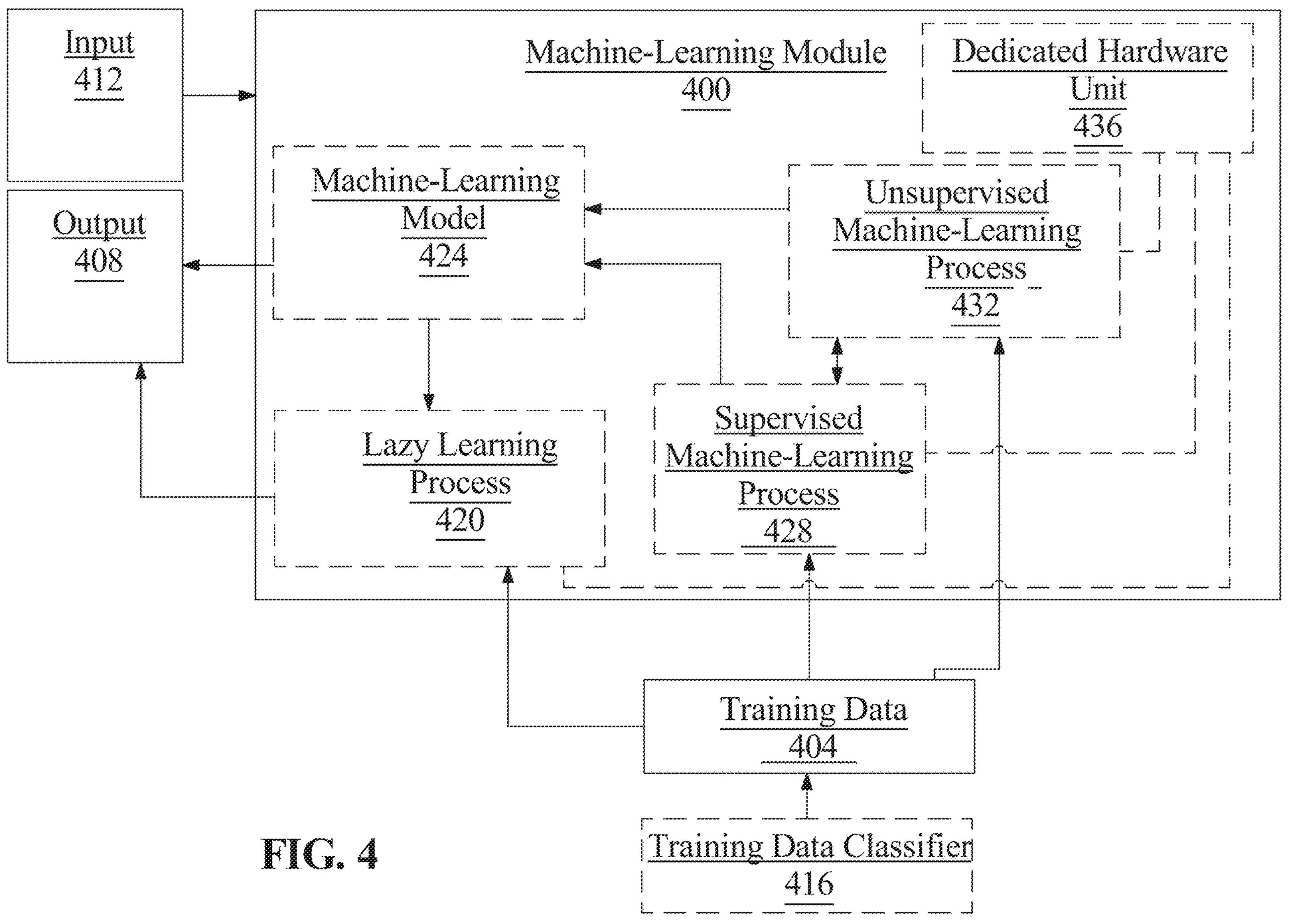
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include inputs such as input fields and/or communication datum and outputs may include outputs such as input classifications.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to classes of information, such as but not limited to, names, occupation, weaknesses, strength and/or the like.

Still referring to FIG. 4, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 4]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs fields and/or communication datum as described above as inputs, input classifications as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
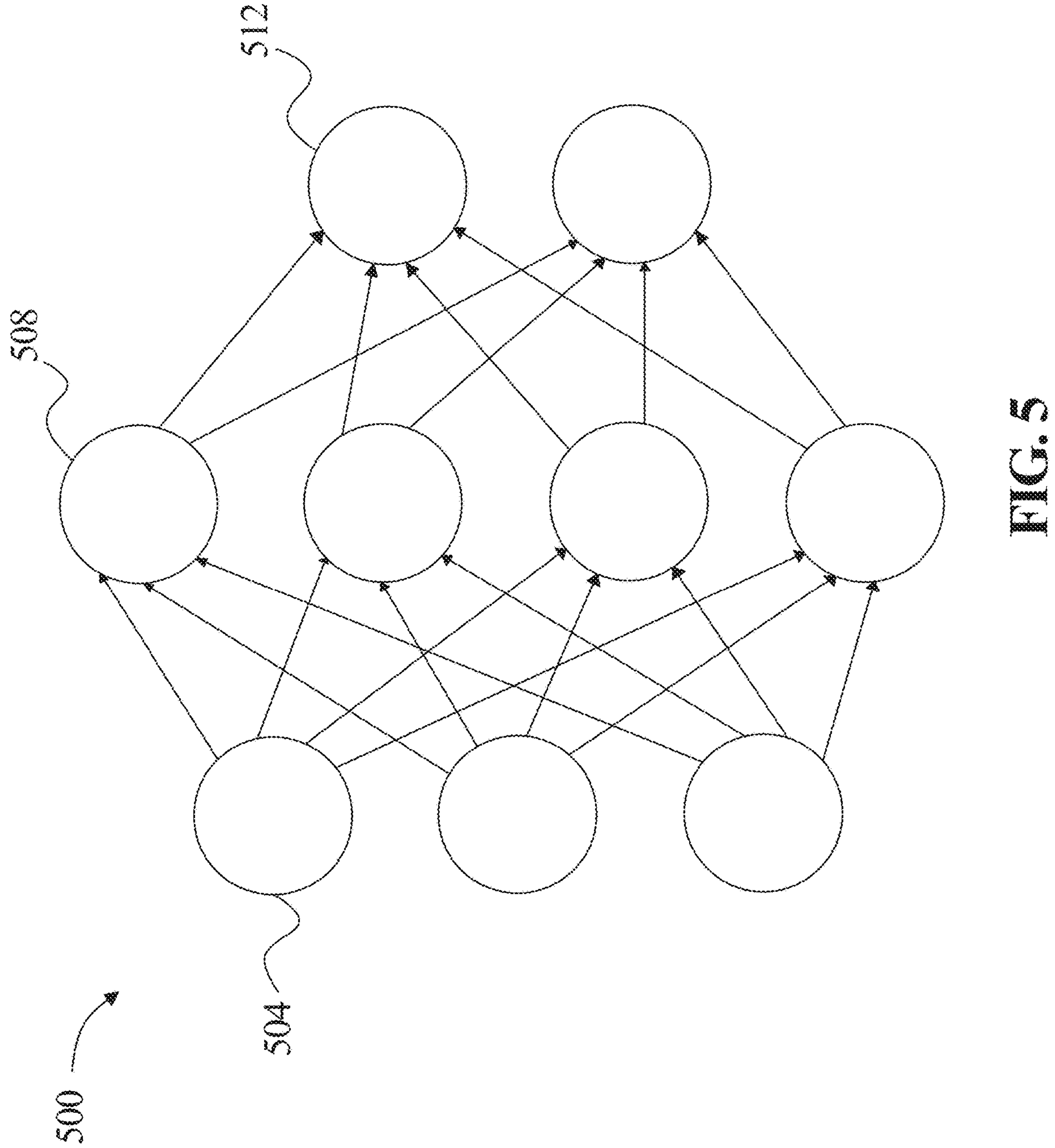
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
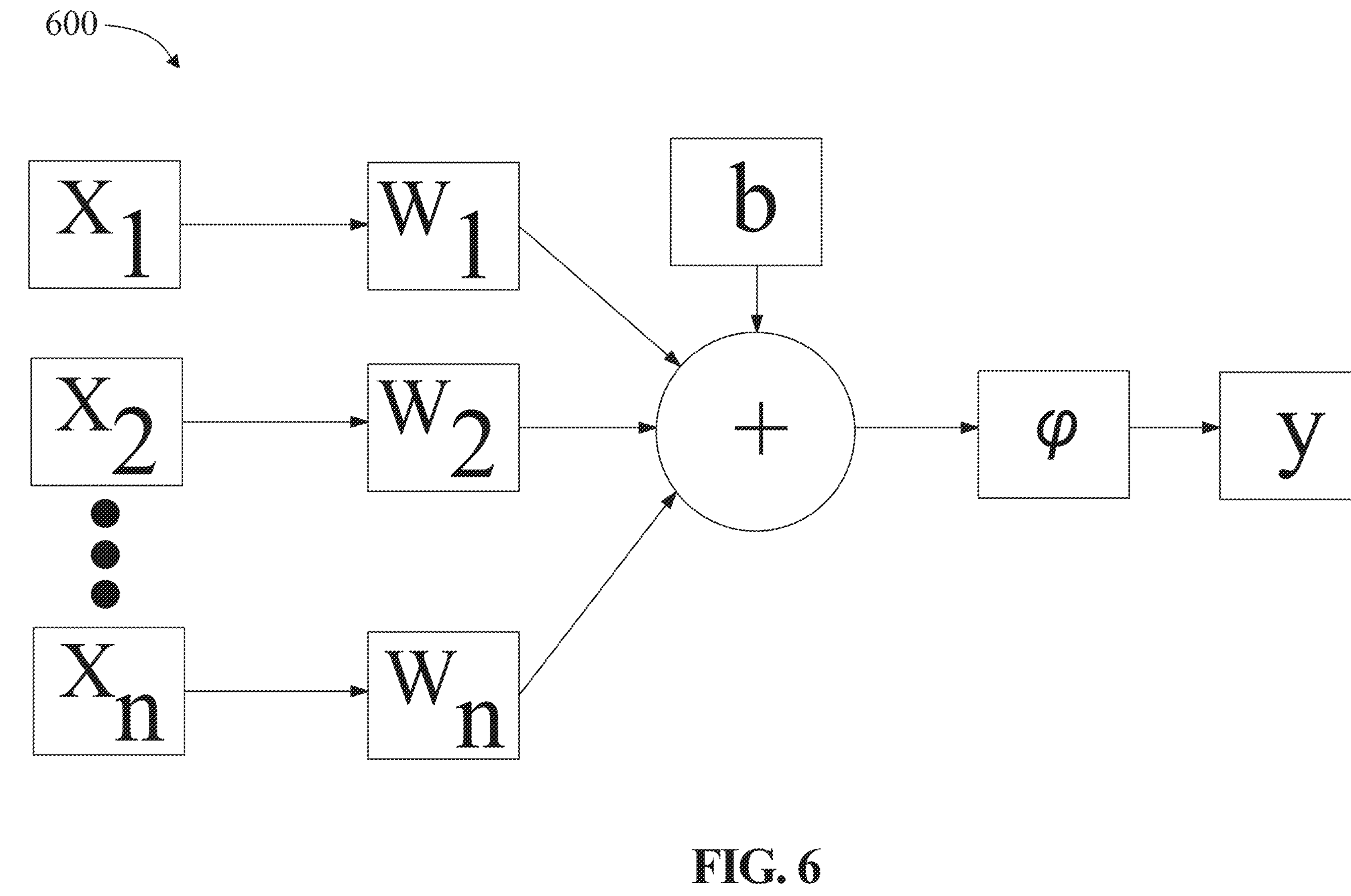
FIG. 6 is a block diagram of an exemplary embodiment of a node of a neural network.

Referring now to FIG. 6, an exemplary embodiment of a node 600 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
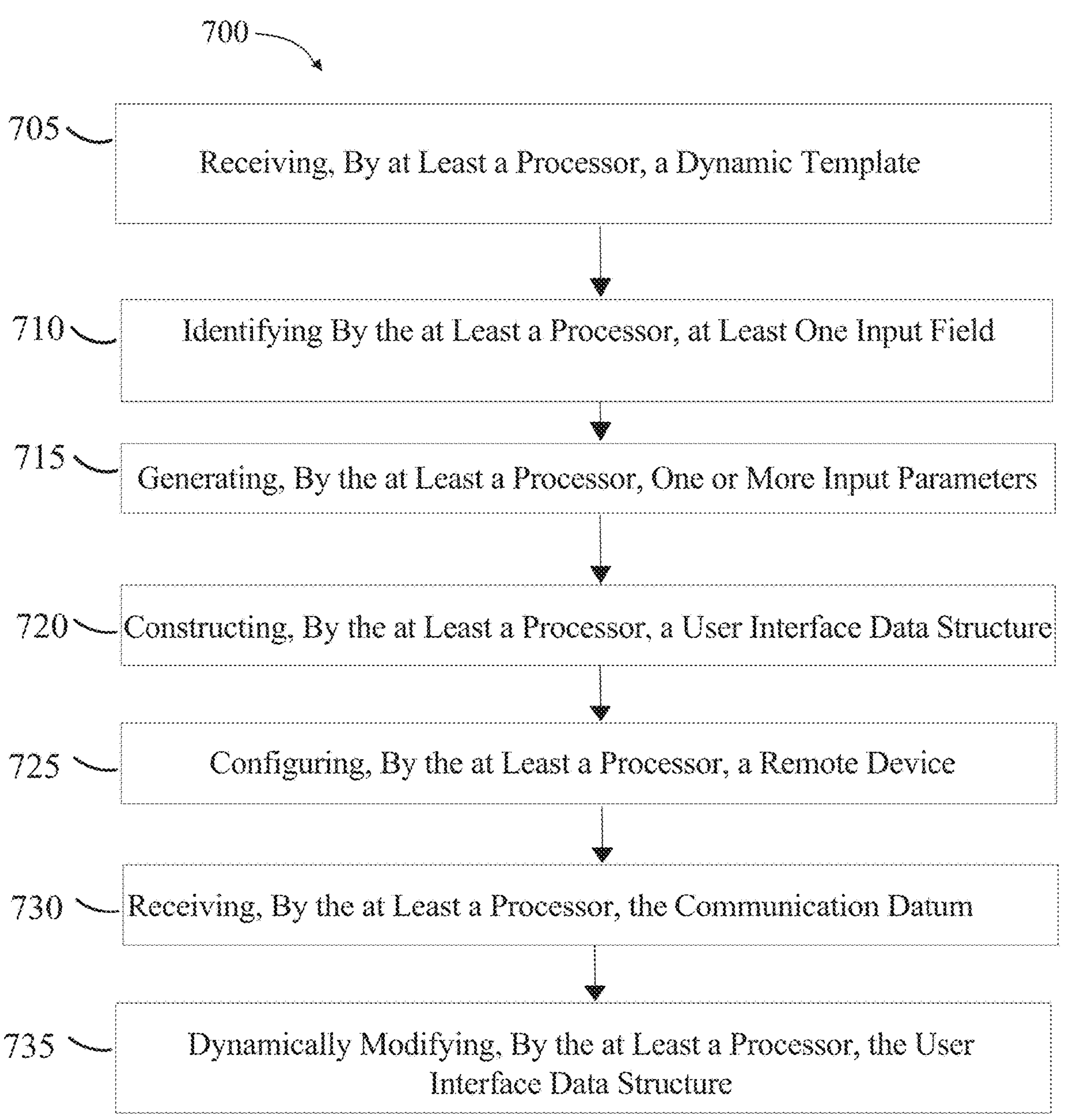
FIG. 7 is a flow diagram illustrating an exemplary embodiment of a method for dynamic data classification with a graphical user interface.

Referring now to FIG. 7, an example method 700 for dynamic data classification within a graphical user interface is described. At step 705, method 700 includes receiving, by at least a processor, a dynamic template including a plurality of input fields. This may be implemented with reference to FIGS. 1-6 and without limitation.

With continued reference to FIG. 7, at step 710 method 700 includes identifying, by the at least a processor, at least one input field of the plurality of input fields for receipt of a communication datum. This may be implemented with reference to FIGS. 1-6 and without limitation.

With continued reference to FIG. 7, at step 715 method 700 includes generating, by the at least a processor and using a machine learning model, one or more input parameters for the at least one input field. In one or more embodiments, each input parameter of the one or more input parameters includes a metadata tag dictating a behavior of a user interface data structure. In one or more embodiments, the machine learning model includes a parameter machine learning model. In one or more embodiments, the machine learning model includes a large language model. This may be implemented with reference to FIGS. 1-6 and without limitation.

With continued reference to FIG. 7, at step 720 method 700 includes constructing, by the at least a processor, a user interface data structure as a function of the one or more metadata tags, wherein the user interface data structure includes the one or more input parameters, an input identifier associated with the at least one input field of the plurality of fields and the dynamic template. In one or more embodiments, the user interface data structure further includes a chatbot system. In one or more embodiments, the user interface data structure includes a plurality of attributes associated with the dynamic template and the input identifier includes a modified attribute associated with the plurality of attributes. In one or more embodiments, the input identifier includes a pulsating effect on the at least one input field. This may be implemented with reference to FIGS. 1-6 and without limitation.

With continued reference to FIG. 7, at step 725 method 700 includes configuring, by the at least a processor, a remote device to generate a graphical view as a function of the user interface data structure. In one or more embodiments, the graphical view includes one or more selectable event graphics corresponding to one or more selectable event handlers, wherein each selectable event handler is configured to trigger at least one event action upon interaction of the one or more selectable event graphics and wherein each selectable event handler is associated with at least one input field of the plurality of input fields. In one or more embodiments, the graphical view includes a first display window visualizing the chatbot system and a second display window visualizing the dynamic template. In one or more embodiments, the first display window is situated adjacent to the second display window. This may be implemented with reference to FIGS. 1-6 and without limitation.

With continued reference to FIG. 7, at step 730 method 700 includes receiving, by the at least a processor, the communication datum from the remote device, wherein the communication datum includes a data response and a feedback element. In one or more embodiments, receiving, by the at least a processor, the communication datum includes classifying elements of the communication datum to one or more input classifications, segmenting the communication datum into one or more input groupings as a function of the classification and selecting one input grouping of the one or more input groupings. This may be implemented with reference to FIGS. 1-6 and without limitation.

With continued reference to FIG. 7 at step 735 method 700 includes dynamically modifying, by the at least a processor, the user interface data structure as a function of the communication datum. In one or more embodiments, dynamically modifying, by the at least a processor, the user interface data structure as a function of the communication datum includes transmitting the communication datum to a large language model, receiving at least a data entry as an output of the large language model and dynamically modifying the user interface data structure as a function of the at least a data entry. In one or more embodiments, dynamically modifying, by the at least a processor, the user interface data structure includes removing the input identifier and appending a subsequent input identifier associated with a subsequent input field of the plurality of input fields. In one or more embodiments, dynamically modifying, by the at least a processor, the user interface data structure as a function of the communication datum includes populating the at least one input field as a function of the one input grouping. This may be implemented with reference to FIGS. 1-6 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
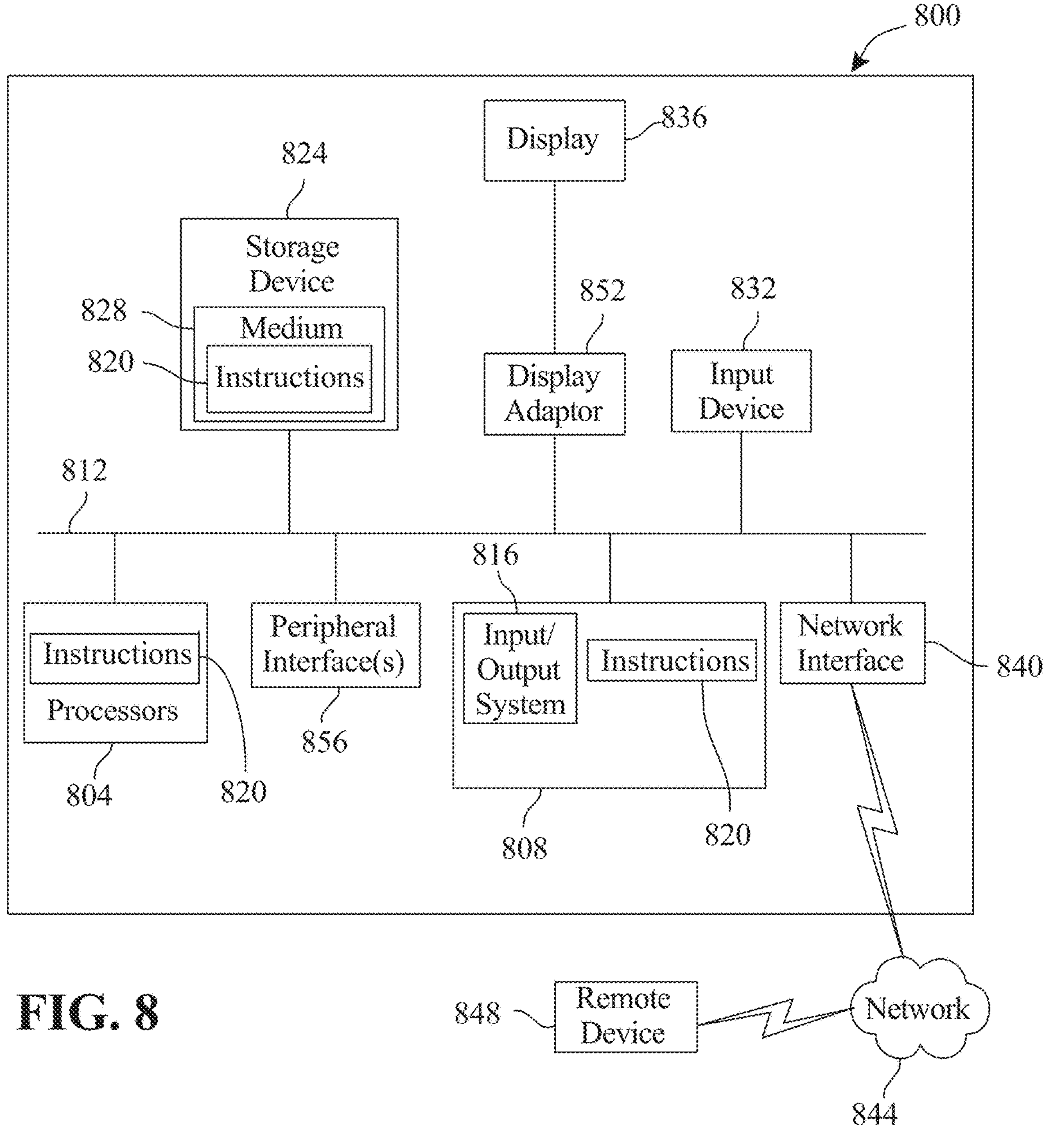
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for dynamic data classification within a graphical user interface, wherein the system comprises: at least a processor; and a memory communicatively connected to the at least a processor, the memory containing instructions configuring the at least a processor to:

receive a dynamic template comprising a plurality of input fields;

categorize the plurality of input fields into four quadrants, wherein each quadrant comprising a grouping of input fields associated with a distinct category of user-related information;

generate, for each quadrant, a sequential order for the plurality of input fields, wherein the sequential order is based on patterns of speech that synthesize human conversation;

identify at least one input field of the plurality of input fields for receipt of a communication datum based on the sequential order;

generate, using a machine learning model, one or more input parameters for the at least one input field, wherein each input parameter of the one or more input parameters comprises a metadata tag dictating a behavior of a user interface data structure, wherein predicted outputs of the machine learning model are compared to actual outputs of the machine learning model, wherein a discrepancy between the predicted outputs of the machine learning model and the actual outputs of the machine learning model are measured to minimize a loss function;

adjust one or more parameters for the at least one input field as a function of the loss function;

construct the user interface data structure as a function of at least one or more metatags, wherein the user interface data structure comprises:

the one or more input parameters;

an input identifier associated with the at least one input field of the plurality of fields; and the dynamic template;

configure a remote device to generate a graphical view as a function of the user interface data structure;

receive the communication datum from the remote device, wherein the communication datum comprises a data response and a feedback element; and dynamically modify the user interface data structure as a function of the communication datum, wherein dynamically modifying the user interface data structure comprises:

removing an input identifier associated with a previously populated input field of the plurality of input fields; and appending a subsequent input identifier associated with a subsequent input field of the plurality of input fields, wherein the subsequent input identifier is appended in order to notify a user that a next set of generated input parameters will be associated with the subsequent input field, wherein the subsequent input identifier remains until a subsequent communication datum is received, and wherein the subsequent identifier is based on the sequential order for the corresponding quadrant.

2. The system of claim 1, wherein dynamically modifying the user interface data structure as a function of the communication datum comprises: transmitting the communication datum to a large language model; receiving at least a data entry as an output of the large language model; and dynamically modifying the user interface data structure as a function of the at least a data entry.

3. The system of claim 1, wherein: the user interface data structure comprises a plurality of attributes associated with the dynamic template; and the input identifier comprises a modified attribute associated with the plurality of attributes.

4. The system of claim 1, wherein the input identifier comprises a pulsating effect on the at least one input field.

5. The system of claim 1, wherein dynamically modifying the user interface data structure comprises: removing the input identifier; and appending a subsequent input identifier associated with a subsequent input field of the plurality of input fields.

6. The system of claim 1, wherein receiving the communication datum comprises: classifying elements of the communication datum to one or more input classifications; segmenting the communication datum into one or more input groupings as a function of the classification; and selecting one input grouping of the one or more input groupings.

7. The system of claim 6, wherein dynamically modifying the user interface data structure as a function of the communication datum comprises populating the at least one input field as a function of the one input grouping.

8. The system of claim 1, wherein the graphical view includes one or more selectable event graphics corresponding to one or more selectable event handlers, wherein each selectable event handler is configured to trigger at least one event action upon interaction of the one or more selectable event graphics and wherein each selectable event handler is associated with at least one input field of the plurality of input fields.

9. The system of claim 1, wherein: the user interface data structure further comprises a chatbot system; and the graphical view includes a first display window visualizing the chatbot system and a second display window visualizing the dynamic template.

10. The system of claim 1, wherein the machine learning model comprises a large language model.

11. A method for dynamic data classification within a graphical user interface, wherein the method comprises:

receiving, by at least a processor, a dynamic template comprising a plurality of input fields;

categorize the plurality of input fields into four quadrants, each quadrant comprising a grouping of input fields associated with a distinct category of user-related information;

generate, for each quadrant, a sequential order for the plurality of input fields, wherein the sequential order is based on patterns of speech that synthesize human conversation;

identifying, by the at least a processor, at least one input field of the plurality of input fields for receipt of a communication datum based on the sequential order;

generating, by the at least a processor and using a machine learning model, one or more input parameters for the at least one input field wherein each input parameter of the one or more input parameters comprises a metadata tag dictating a behavior of a user interface data structure, wherein predicted outputs of the machine learning model are compared to actual outputs of the machine learning model, wherein a discrepancy between the predicted outputs of the machine learning model and the actual outputs of the machine learning model are measured to minimize a loss function;

adjusting, by the at least a processor, one or more parameters for the at least one input field as a function of the loss function;

constructing, by the at least a processor, the user interface data structure as a function of at least one or more metatags, wherein the user interface data structure comprises:

the one or more input parameters;

an input identifier associated with the at least one input field of the plurality of fields; and the dynamic template;

configuring, by the at least a processor, a remote device to generate a graphical view as a function of the user interface data structure;

receiving, by the at least a processor, the communication datum from the remote device, wherein the communication datum comprises a data response and a feedback element; and dynamically modifying, by the at least a processor, the user interface data structure as a function of the communication datum, wherein dynamically modifying the user interface data structure comprises:

removing an input identifier associated with a previously populated input field of the plurality of input fields; and appending a subsequent input identifier associated with a subsequent input field of the plurality of input fields, wherein the subsequent input identifier is appended in order to notify a user that a next set of generated input parameters will be associated with the subsequent input field, wherein the subsequent input identifier remains until a subsequent communication datum is received, and wherein the subsequent identifier is based on the sequential order for the corresponding quadrant.

12. The method of claim 11, wherein dynamically modifying, by the at least a processor, the user interface data structure as a function of the communication datum comprises: transmitting the communication datum to a large language model; receiving at least a data entry as an output of the large language model; and dynamically modifying the user interface data structure as a function of the at least a data entry.

13. The method of claim 11, wherein: the user interface data structure comprises a plurality of attributes associated with the dynamic template; and the input identifier comprises a modified attribute associated with the plurality of attributes.

14. The method of claim 11, wherein the input identifier comprises a pulsating effect on the at least one input field.

15. The method of claim 11, wherein dynamically modifying, by the at least a processor, the user interface data structure comprises: removing the input identifier; and appending a subsequent input identifier associated with a subsequent input field of the plurality of input fields.

16. The method of claim 11, wherein receiving, by the at least a processor, the communication datum comprises: classifying elements of the communication datum to one or more input classifications; segmenting the communication datum into one or more input groupings as a function of the classification; and selecting one input grouping of the one or more input groupings.

17. The method of claim 16, wherein dynamically modifying, by the at least a processor, the user interface data structure as a function of the communication datum comprises populating the at least one input field as a function of the one input grouping.

18. The method of claim 11, wherein the graphical view includes one or more selectable event graphics corresponding to one or more selectable event handlers, wherein each selectable event handler is configured to trigger at least one event action upon interaction of the one or more selectable event graphics and wherein each selectable event handler is associated with at least one input field of the plurality of input fields.

19. The method of claim 11, wherein: the user interface data structure further comprises a chatbot system; and the graphical view includes a first display window visualizing the chatbot system and a second display window visualizing the dynamic template.

20. The method of claim 11, wherein the machine learning model comprises a large language model.

* * * * *